(12) United States Patent
Onishi

(10) Patent No.: US 10,101,900 B2
(45) Date of Patent: Oct. 16, 2018

(54) INFORMATION PROCESSING DEVICE AND METHOD OF PROCESSING INFORMATION

(71) Applicant: SONY CORPORATION, Tokyo (JP)

(72) Inventor: Yusuke Onishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 391 days.

(21) Appl. No.: 14/759,896

(22) PCT Filed: Jan. 9, 2014

(86) PCT No.: PCT/JP2014/050178
§ 371 (c)(1),
(2) Date: Jul. 8, 2015

(87) PCT Pub. No.: WO2014/112419
PCT Pub. Date: Jul. 24, 2014

(65) Prior Publication Data
US 2015/0355812 A1 Dec. 10, 2015

(30) Foreign Application Priority Data

Jan. 16, 2013 (JP) .................................. 2013-005340

(51) Int. Cl.
*G06F 3/048* (2013.01)
*G06F 3/0488* (2013.01)
*G06F 3/0484* (2013.01)
*G06F 3/041* (2006.01)

(52) U.S. Cl.
CPC .......... *G06F 3/0488* (2013.01); *G06F 3/0416* (2013.01); *G06F 3/04842* (2013.01); *G06F 3/04886* (2013.01)

(58) Field of Classification Search
CPC ....................................................... G06F 3/048
See application file for complete search history.

(56) References Cited

U.S. PATENT DOCUMENTS

| | | | | |
|---|---|---|---|---|
| 2010/0162137 A1* | 6/2010 | Ganz | .................... | G06F 3/011 715/757 |
| 2011/0018827 A1* | 1/2011 | Wang | .................... | G06F 3/0482 345/173 |
| 2011/0312387 A1* | 12/2011 | Heo | .................... | G06F 3/0481 455/566 |
| 2012/0032979 A1* | 2/2012 | Blow et al. | ........... | G06F 3/0488 345/647 |

(Continued)

*Primary Examiner* — Xuyang Xia
(74) *Attorney, Agent, or Firm* — Chip Law Group

(57) ABSTRACT

Provided is an information processing device including: a display unit configured to display a screen including an operation target to be subjected to a contact operation; a first detection unit configured to detect an object on the display unit; a second detection unit configured to detect an operation unavailable region among display regions of the screen based on a detection result obtained by the first detection unit, the operation unavailable region being a region in which an operation using the operation target is unable to be performed; and a change processing unit configured to change a configuration of the screen based on priority that is set for each operation target and to allow the operation target to be displayed in an operation available region, the operation available region being a region other than the operation unavailable region.

18 Claims, 18 Drawing Sheets

(56) References Cited

U.S. PATENT DOCUMENTS

| | | | |
|---|---|---|---|
| 2013/0024815 A1* | 1/2013 | O | H04M 1/72586 |
| | | | 715/811 |
| 2013/0162688 A1* | 6/2013 | Matsuoka | H04N 9/3188 |
| | | | 345/682 |
| 2014/0108979 A1* | 4/2014 | Davidson et al. | G06F 3/0488 |
| | | | 715/765 |

* cited by examiner

FIG. 18
A 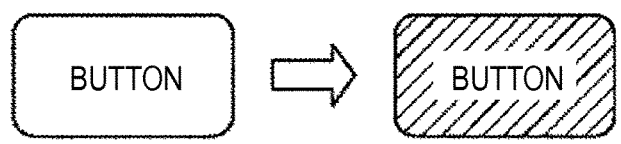
B 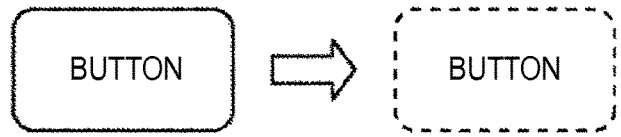
C 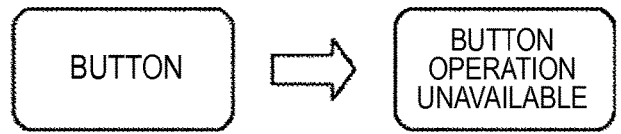

INFORMATION PROCESSING DEVICE AND METHOD OF PROCESSING INFORMATION

TECHNICAL FIELD

The present technology relates to an information processing device, a method of processing information, and a program. More specifically, the present technology relates to an information processing device, a method of processing information, and a program, capable of making users aware of the presence of a region unable to be operated.

BACKGROUND ART

An electronic apparatus in which an operation is performed by touching directly on a touch panel with a finger or stylus (touch pen), such as so-called smartphone or tablet terminal, is commonly used.

In such electronic apparatus, there may exist a region in which an object such as a part of the user's body or water droplets is placed on a display (screen) provided with a touch panel as an obstacle and thus is unable to be operated. In this case, the user who is unaware of the presence of a region unable to be operated may feel confused.

Therefore, various techniques for eliminating the situation where the user has difficulty in operating have been developed. For example, Patent Literature 1 discloses a technique for detecting a region with water adhered thereon to erase an operation image in a region with water adhered thereon by disabling it, but to display an operation image in a region with no water adhered thereon in enlargement.

CITATION LIST

Patent Literature

Patent Literature 1: JP 2012-123740A

SUMMARY OF INVENTION

Technical Problem

An electronic apparatus in which an operation is performed using a touch panel is spreading rapidly, and thus such problems as described above are considered to become more apparent.

The present technology has been made in view of the above circumstances, and it is possible to make users aware of the presence of a region unable to be operated.

Solution to Problem

According to an aspect of the present technology, there is provided an information processing device including: a display unit configured to display a screen including an operation target to be subjected to a contact operation; a first detection unit configured to detect an object on the display unit; a second detection unit configured to detect an operation unavailable region among display regions of the screen based on a detection result obtained by the first detection unit, the operation unavailable region being a region in which an operation using the operation target is unable to be performed; and a change processing unit configured to change a configuration of the screen based on priority that is set for each operation target and to allow the operation target to be displayed in an operation available region, the operation available region being a region other than the operation unavailable region.

A storage unit configured to store information indicating whether an operation is available, as information indicating a condition of a position of each of the display regions can be further included.

The second detection unit can detect a difficult-to-operate region based on the detection result obtained by the first detection unit, the difficult-to-operate region being a region in which an operation using the operation target is difficult to perform. The storage unit can store any information among information indicating that an operation is available, information indicating that an operation is unavailable, and information indicating that an operation is difficult to perform, as information indicating a condition of a position of each of the display regions.

The change processing unit can change the screen configuration when there is the operation target in which a ratio of an area of the operation unavailable region to an area of the operation target is greater than a first threshold. In this case, the threshold can vary depending on an area of the operation target.

The change processing unit can calculate a score as a reference for determining whether the screen configuration is to be changed for each of the operation targets, based on a weight depending on the priority and a type of the object.

The change processing unit can calculate a first sum and a second sum and decide a type of change in the screen configuration based on a ratio of the second sum to the first sum, the first sum being a sum of the scores of all of the operation targets included in the screen, the second sum being a sum of the scores of the operation targets in which a ratio of an area of the operation unavailable region to an area of the operation target is greater than the first threshold.

The change processing unit can determine that the screen configuration is unnecessary to be changed when the ratio of the second sum to the first sum is smaller than a second threshold, and determine that the screen configuration is unable to be changed when the ratio of the second sum to the first sum is greater than a third threshold.

The change processing unit, when the ratio of the second sum to the first sum is smaller than the second threshold, can change a display of the operation target in which the ratio of an area of the operation unavailable region to an area of the operation target is greater than the first threshold, without changing the screen configuration.

The change processing unit, when the ratio of the second sum to the first sum is smaller than the second threshold, can allow information indicating that an operation using the operation target in which the ratio of an area of the operation unavailable region to an area of the operation target is greater than the first threshold is unable to be performed to be displayed, without changing the screen configuration.

The change processing unit can change the screen configuration in a way that only the operation target having high priority is displayed in the operation available region.

The change processing unit can allow the operation target having a large area to be displayed in the operation available region when the priority of the operation target is identical.

The change processing unit can allow a predetermined button to be displayed in the operation available region and allow the operation target having low priority, instead of the operation target having high priority, to be displayed in the operation available region in response to an operation of the predetermined button.

The change processing unit can allow all of the operation targets included in the screen to be displayed in the operation available region in a reduced form with arrangement maintained.

The change processing unit can allow information assigned to the operation target to be displayed in a reduced form or an abbreviated form.

The change processing unit can allow all of the operation targets included in the screen to be displayed in the operation available region with a change in arrangement of each operation target.

The change processing unit, when the operation available regions are disposed at a plurality of places, can allow the operation target having high priority to be displayed preferentially in the operation available region having a large area.

The change processing unit can allow information assigned to the operation target to be displayed in a reduced form or an abbreviated form.

According to an embodiment of the present technology, a screen including an operation target to be subjected to a contact operation is displayed on a display unit, an object on the display unit is detected, and an operation unavailable region among display regions of the screen is detected based on a detection result of the object, the operation unavailable region being a region in which an operation using the operation target is unable to be performed. A configuration of the screen is changed based on priority that is set for each operation target and the operation target is allowed to be displayed in an operation available region, the operation available region being a region other than the operation unavailable region.

Advantageous Effects of Invention

According to the embodiments of the present technology, it is intended to make users aware of the presence of a region unable to be operated.

BRIEF DESCRIPTION OF DRAWINGS

FIG. 18 is a diagram illustrating a modification 1 of a display state of an operation target.

DESCRIPTION OF EMBODIMENTS

<Appearance and Display Screen of Electronic Apparatus>

Figure 1:
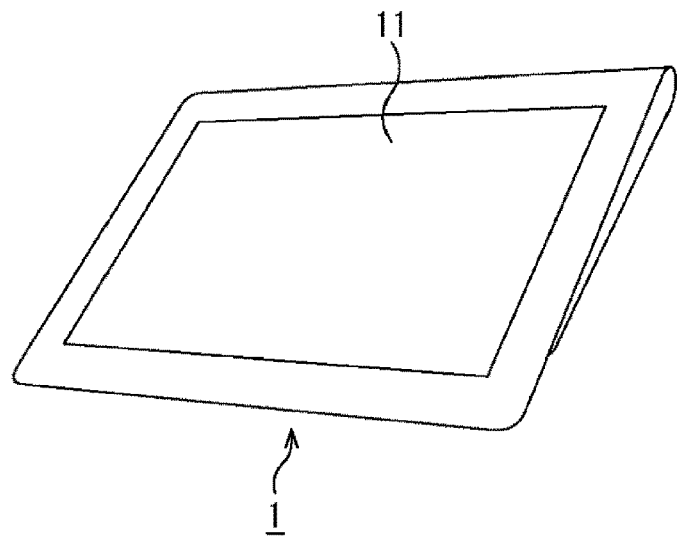
FIG. 1 is a diagram illustrating an example of appearance of an electronic apparatus according to an embodiment of the present technology.

FIG. 1 is a diagram illustrating an example of appearance of an electronic apparatus according to an embodiment of the present technology.

The electronic apparatus 1 is a tablet terminal including a plate-like housing having a size that can be held in one hand by the user. The electronic apparatus 1 is provided with a display unit 11 configured to include a liquid-crystal display (LCD) or the like on the front of the housing. The display unit 11 is provided with a touch panel stacked thereon. The user can operate buttons or the like displayed on the display unit 11 by touching directly it with a finger.

Figure 2:
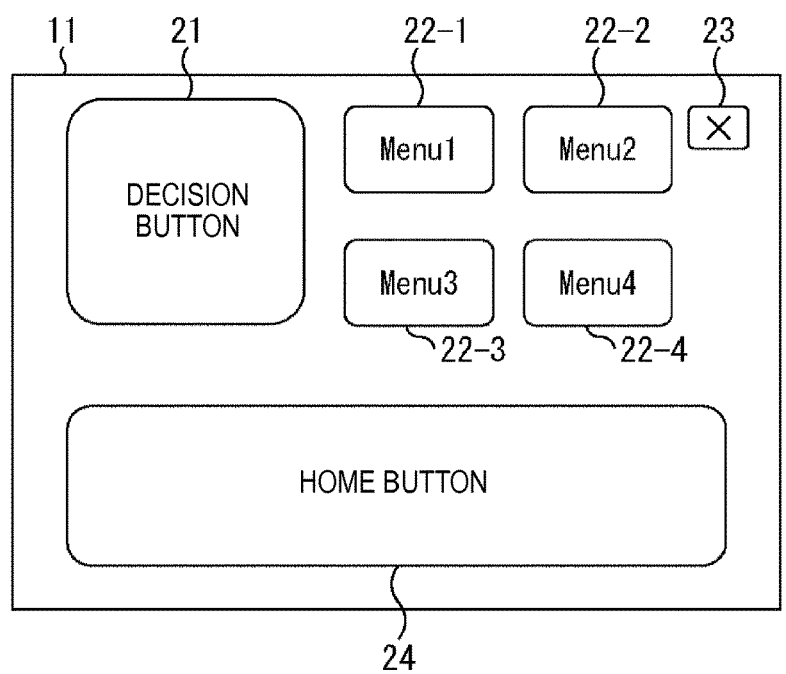
FIG. 2 is a diagram illustrating an example of a screen displayed on a display unit.

FIG. 2 is a diagram illustrating an example of a screen displayed on the display unit 11.

In FIG. 2, the screen displays a decision button 21, setting buttons 22-1 to 22-4, a close button 23, and a home button 24, as an operation target. The operation target means any object that can be used for operation, such as buttons or a slide bar. The operation target does not contain background or information that is unable to be operated.

The decision button 21 is constituted as a display of the text "DECISION BUTTON" on the inside of a rounded rectangle shape arranged in the upper left of the screen. The decision button 21 is a button to be operated to decide an item.

The setting buttons 22-1 to 22-4 are constituted by displaying "MENU 1", "MENU 2", "MENU 3", and "MENU 4" on the inside of each of four rounded rectangle shapes arranged on the immediate right of the decision button 21. These four rounded shapes are arranged at predetermined distance from each other as an array of two rows by two columns. The setting buttons 22-1 to 22-4 are buttons representing options of a predetermined item such as a parameter relating to functions of the electronic apparatus 1. The user selects a predetermined item by pressing one of the setting buttons 22-1 to 22-4.

The close button 23 is constructed by displaying a cross (x mark) on the inside of a rounded rectangle shape arranged in the upper right of the screen. The close button is a button to be operated to close the screen of FIG. 2.

The home button 24 is constructed as a display of the text "HOME BUTTON" on the inside of a horizontally long rounded rectangular shape arranged in the lower part of the screen. The home button 24 is a button to be operated to display a start screen of the electronic apparatus 1. An icon representing various applications is displayed on the start screen and is used to select an application to be executed.

In the state where the screen having a configuration described above is displayed, when the presence of an operation shielding object such as water droplets or an operation obstructing object such as a part of the user's body placed on the display unit 11 is detected, a process for dynamically changing the screen configuration is performed in the electronic apparatus 1. The operation shielding object and operation obstructing object are collectively referred to as "obstacle" as appropriate hereinafter.

Figure 3:
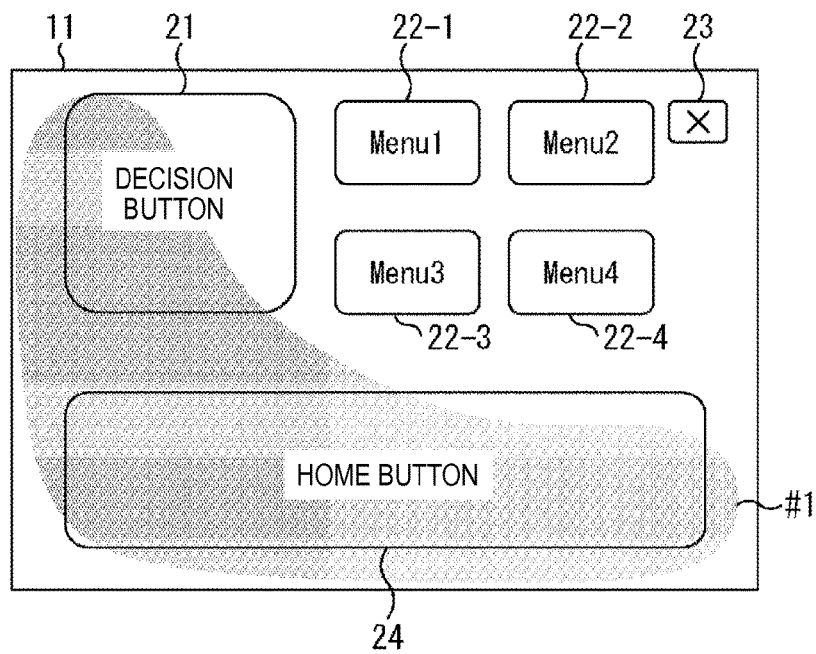
FIG. 3 is a diagram illustrating an example of a state in which an obstacle is placed on the display unit.

FIG. 3 is a diagram illustrating an example of a state in which an obstacle is placed on the display unit 11.

In the example shown in FIG. 3, there is an obstacle in a region #1 extending over nearly left half of the decision button 21 and the entire home button 24. The electronic apparatus 1 detects the presence of an obstacle, and the region #1 is set as an operation unavailable region.

Figure 4:
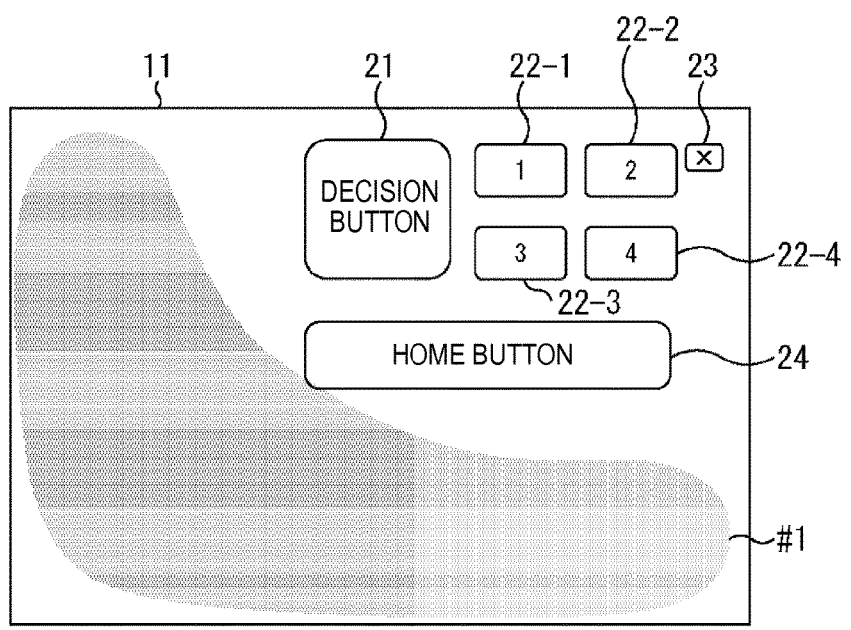
FIG. 4 is a diagram illustrating an example in which a screen configuration is changed.

In this case, for example as shown in FIG. 4, all of the operation targets that constitute the screen are reduced in size and are displayed in a region other than the region #1 while maintaining their positional relationship to each other. The region in which the operation targets are displayed in the upper right of the screen is a region without an obstacle, that is, an operation available region.

As shown in FIG. 4, numeral characters "1" to "4" are respectively displayed on the setting buttons 22-1 to 22-4. In this way, information including texts, number, and symbol assigned to each operation target is abbreviated and is displayed as appropriate.

In this way, by moving an operation target placed in the operation unavailable region to the operation available region, it is possible for the user to be aware of the presence of the operation unavailable region. For example, when the user operates the home button 24 in the state as shown in FIG. 3, if nothing happened or unintended process is performed, the user may feel confused. This can be prevented.

The presence of the operation unavailable region is explicitly indicated, and thus it is possible to allow the user to perform a task of removing an obstacle or the like.

Furthermore, by moving an operation target to the operation available region, it is possible for the user to continue to perform an operation.

Figure 5:
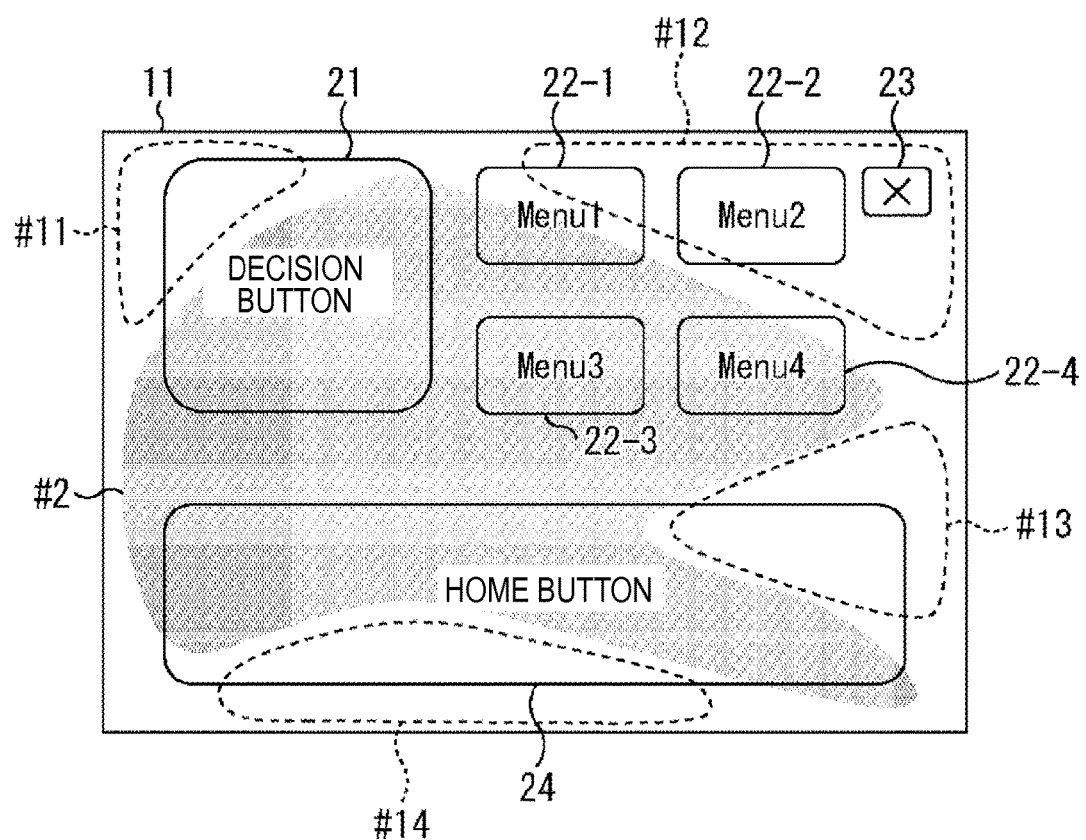
FIG. 5 is a diagram illustrating another example of a state in which an obstacle is placed on the display unit.

FIG. 5 is a diagram illustrating another example of a state in which an obstacle is placed on the display unit 11.

In the example shown in FIG. 5, there is an obstacle in a region #2 that extends over a part exclusive of the upper left of the decision button 21, nearly lower half of the setting button 22-1, nearly the entire parts of the setting buttons 22-3 and 22-4, and a part exclusive of the lower and the upper right of the home button 24. The electronic apparatus 1 detects the presence of an obstacle, and the region #2 is set as an operation unavailable region.

In the example shown in FIG. 5, as surrounded by the dashed line, a region #11 in the upper left corner of the screen, a region #12 in the upper right corner of the screen, a region #13 on the right side of the screen, and a region #14 on the lower side of the screen remain as the operation available region. For example, a region having a size larger than a predetermined area of regions other than the operation unavailable region is set as an operation available region.

Figure 6:
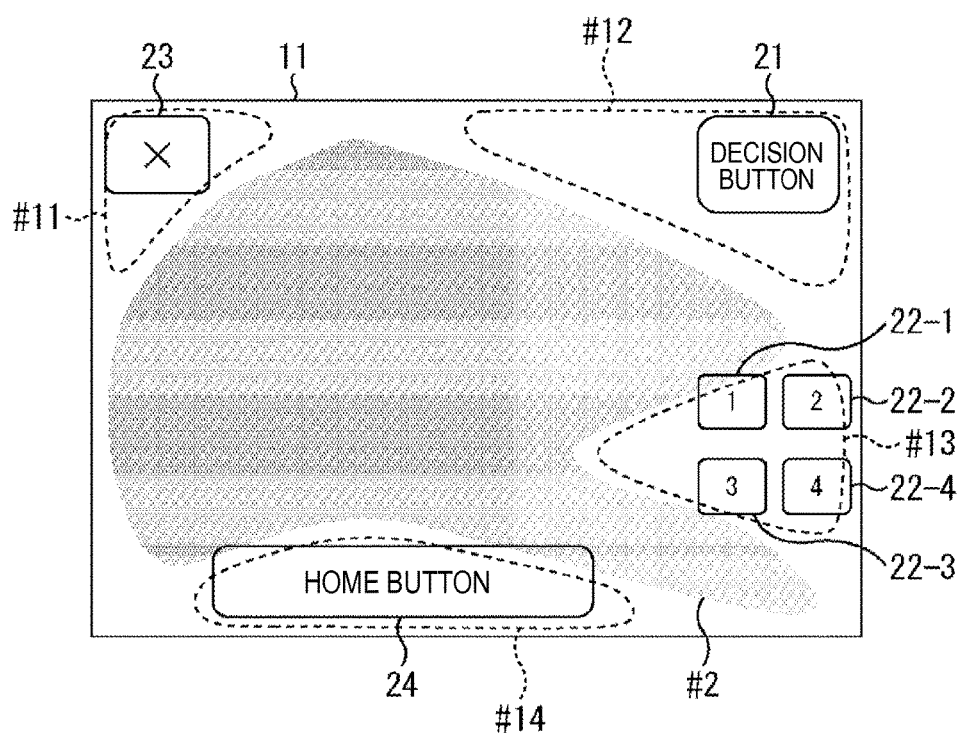
FIG. 6 is a diagram illustrating another example in which a screen configuration is changed.

In this case, for example as shown in FIG. 6, all of the operation targets that constitute the screen are displayed in their respective operation available regions by changing their positional relationships and sizes as appropriate.

In the example shown in FIG. 6, the close button 23 is displayed in the region #11 at the upper left corner of the screen in an enlarged form, and the decision button 21 is displayed in the region #12 at the upper right corner of the screen in a reduced form. The setting buttons 22-1 to 22-4 are displayed in the region #13 on the right side of the screen in a reduced and modified form, and the home button 24 is displayed in the region #14 on the lower side of the screen in a reduced form.

As described later, the assignment of the operation target to the operation available region is performed based on the priority that is set for each operation target. Although the setting buttons 22-1 to 22-4 are displayed together in the same operation available region in the example shown in FIG. 5, this is implemented by performing the grouping of operation targets in advance.

The assignment of the operation target to the operation available region based on the priority that is set for each operation target enables a more important button to be displayed in a wider operation available region. The grouping of operation targets enables operation targets used for similar operations to be moved on a group basis.

The process performed by the electronic apparatus 1 that dynamically changes the screen configuration as described above will be described in detail with reference to flowchart.

The change of a screen configuration is performed in the following particular circumstances.

EXAMPLE 1. A condition in which, when the electronic apparatus 1 is operated beside the waters, a capacitive touch panel is unable to be operated because many water droplets adhere to a screen.

EXAMPLE 2. A condition in which, when an electronic apparatus is held with one hand, an operation is unable by only placing a thumb because the thumb of the hand holding the electronic apparatus is placed in a screen.

EXAMPLE 3. A condition in which an operation is unable for a portion at which a pen is placed on a medium-sized screen of a tablet terminal and so on or a scratch paper is pasted on the screen.

EXAMPLE 4. A condition in which a button or an icon is displayed under any object such as a cup or a book placed on a large-sized screen.

EXAMPLE 5. A condition in which, when an operation is performed with a stylus or the like, a screen is hidden by the back of one hand holding the stylus and an operation of the hidden part is unable by another hand.

<Configuration of Electronic Apparatus 1>

Figure 7:
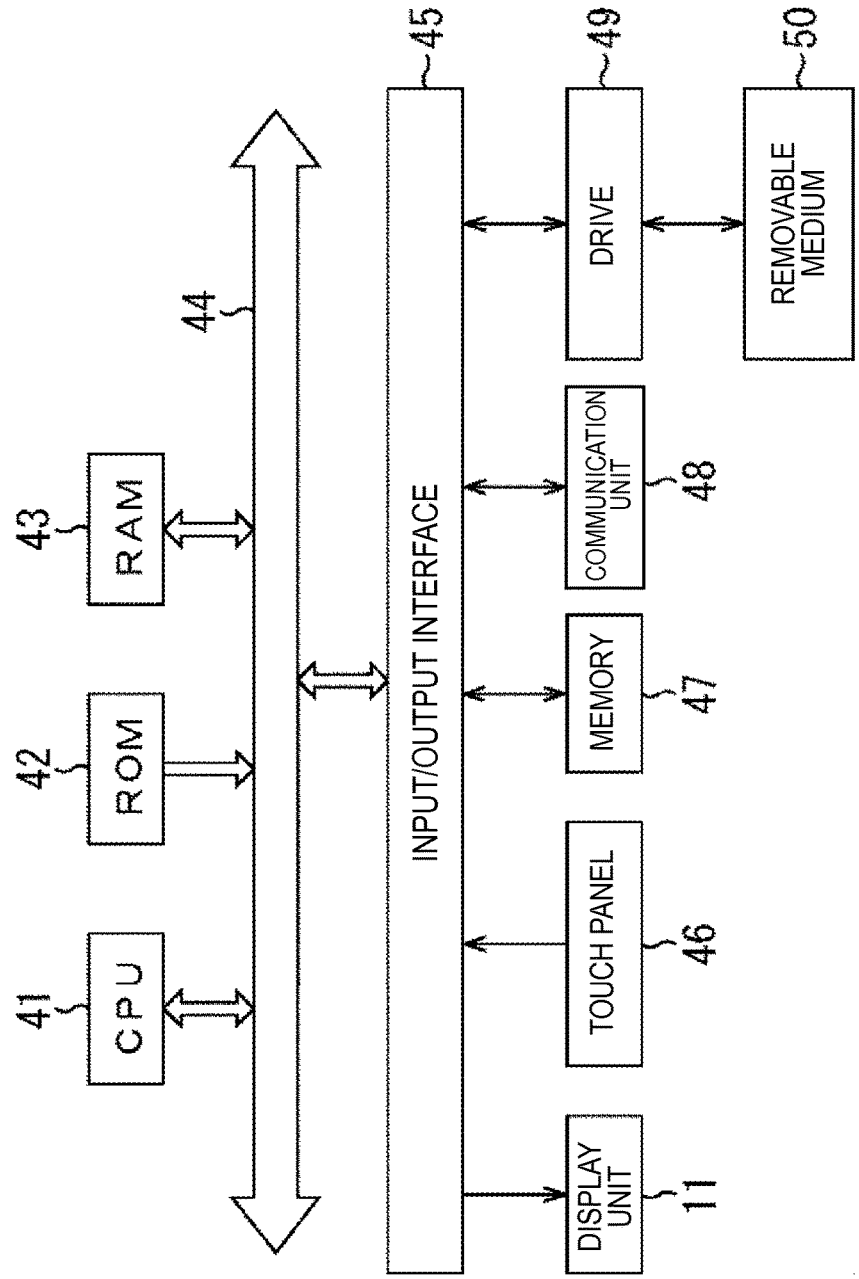
FIG. 7 is a block diagram illustrating an exemplary hardware configuration of an electronic apparatus.

FIG. 7 is a block diagram illustrating an exemplary hardware configuration of the electronic apparatus 1.

A central processing unit (CPU) 41, a read only memory (ROM) 42, and a random access memory (RAM) 43 are connected to each other via a bus 44. The bus 44 is connected with an input/output interface 45. The input/output interface 45 is connected with a touch panel 46, a memory 47, a communication unit 48, and a drive 49, in addition to the display unit 11.

The display unit 11 displays a screen including various operation targets under the control of the CPU 41.

The touch panel 46 is provided to be stacked on the display unit 11 and detects an operation by the user with fingers or a stylus. The touch panel 46 outputs a signal indicating detection results to the CPU 41 via the input/output interface 45 and the bus 44.

The memory 47 is configured to include a flash memory and stores programs executed by the CPU 41 and various types of data such as contents to be displayed on the display unit 11.

The communication unit 48 communicates with an external apparatus by wireless LAN communication, Bluetooth (registered trademark) communication, or the like.

The drive 49 reads data from a removable medium 50 and stores data in the removable medium 50. The removable medium 50 may be a memory card inserted into a slot formed in a housing of the electronic apparatus 1 or may be a storage medium such as a USB memory to be installed at a USB terminal or the like.

Figure 8:
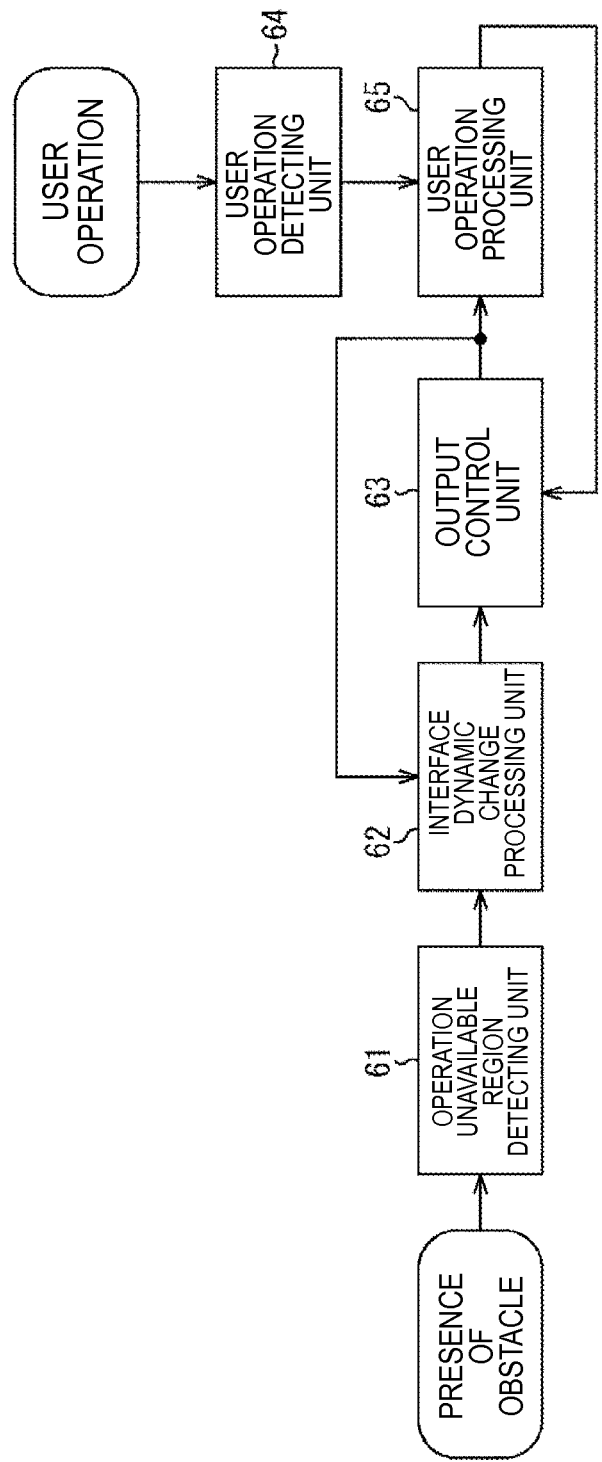
FIG. 8 is a block diagram illustrating an exemplary functional configuration of the electronic apparatus.

FIG. 8 is a block diagram illustrating an exemplary functional configuration of the electronic apparatus 1.

As shown in FIG. 8, the electronic apparatus 1 implements an operation unavailable region detecting unit 61, an interface dynamic change processing unit 62, an output control unit 63, a user operation detecting unit 64, and a user operation processing unit 65 therein. At least some of the functional units shown in FIG. 8 may be implemented by causing the CPU 41 shown in FIG. 7 to execute a given program.

The operation unavailable region detecting unit 61 detects an obstacle on the display unit 11 based on the signal supplied from the touch panel 46. The operation unavailable region detecting unit 61 sets a region in which there is an obstacle among regions displayed on the display unit 11 as the operation unavailable region, and outputs information on the operation unavailable region to the interface dynamic change processing unit 62.

The interface dynamic change processing unit 62 specifies an operation unavailable region based on the information supplied from the operation unavailable region detecting unit 61, and changes the screen configuration as appropriate. The interface dynamic change processing unit 62 outputs the information representing the changed screen configuration to the output control unit 63.

The output control unit 63 allows the display unit 11 to display a screen including various operation targets. The output control unit 63 allows the screen in which an operation target is moved or the size thereof is changed to be displayed based on the information supplied from the interface dynamic change processing unit 62. The output control unit 63 supplies information relating to the position or size of each operation target included in the screen to the interface dynamic change processing unit 62 and the user operation processing unit 65.

The user operation detecting unit 64 detects a user operation based on the signal supplied from the touch panel 46 and outputs information representing a position operated by the user to the user operation processing unit 65.

When it is detected that an operation target is operated based on the information supplied from the user operation detecting unit 64, the user operation processing unit 65 controls the output control unit 63 to change a display of the screen depending on the user operation, such as by switching a display of a button to another.

<Operation of Electronic Apparatus 1>

A process performed by the electronic apparatus 1 having the configuration as described above will be described.

[Overall Process by Electronic Apparatus 1]

Figure 9:
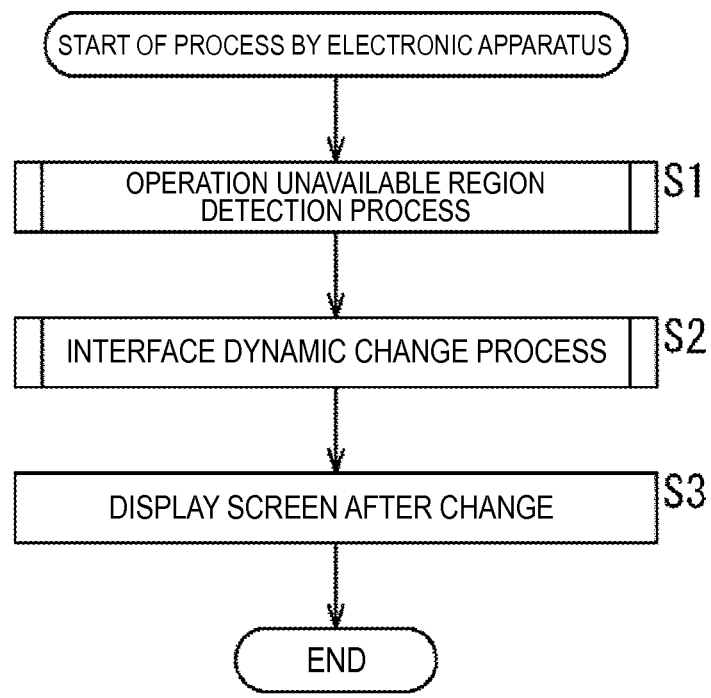
FIG. 9 is a flowchart illustrated to describe the overall process to be performed by the electronic apparatus.

The overall process performed by the electronic apparatus 1 will be described with reference to the flowchart of FIG. 9. The process illustrated in FIG. 9 is started, for example, after a screen including various operation targets is displayed.

In step S1, the operation unavailable region detecting unit 61 performs an operation unavailable region detecting process. The operation unavailable region detecting process is a process for taking notice of each element used to detect an input and for performing the determination of whether the detection of the user operation in the noticed element is possible for the elements of the entire screen. The detailed particulars of the operation unavailable region detecting process will be described later with reference to the flowchart of FIG. 10. The information on the operation unavailable region detected by performing the operation unavailable region detecting process is supplied to the interface dynamic change processing unit 62.

In step S2, the interface dynamic change processing unit 62 performs an interface dynamic change process. The interface dynamic change process is a process for changing the screen configuration. The detailed particulars of the interface dynamic change process will be described later with reference to the flowchart of FIG. 11. The interface dynamic change processing unit 62 supplies the information on the changed screen configuration to the output control unit 63.

In step S3, the output control unit 63, when the screen configuration is changed, allows the display unit 11 to display the screen having the changed configuration based on the information supplied from the interface dynamic change processing unit 62.

A change of only the display state of an operation target without a change of the screen configuration depending on the condition of an obstacle may be set by the interface dynamic change process. In this case, the output control unit 63 performs a process, for example, changing the display of an operation target in step S3 based on the information supplied from the interface dynamic change processing unit 62.

[Operation Unavailable Region Detecting Process]

Figure 10:
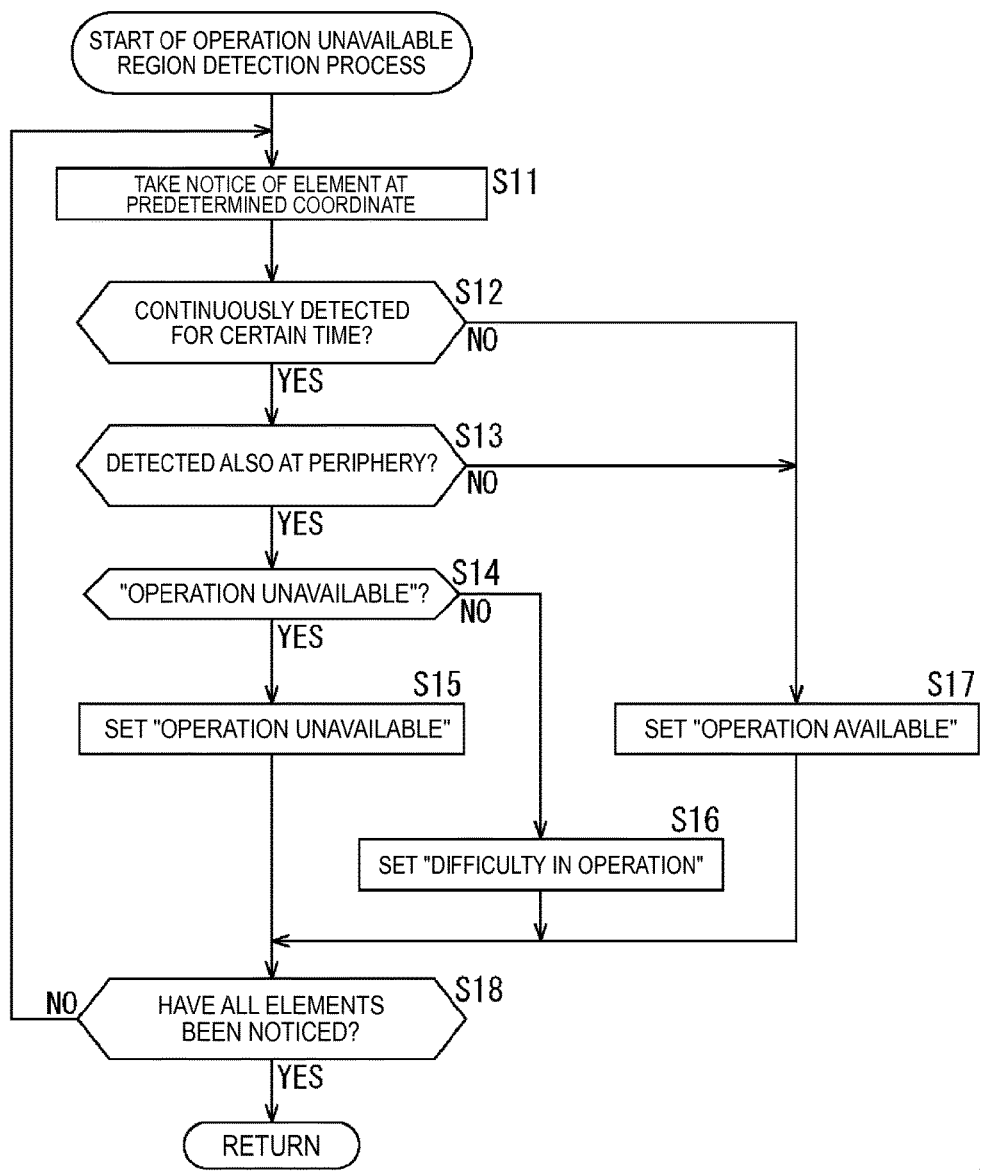
FIG. 10 is a flowchart illustrated to describe an operation unavailable region detecting process to be performed in step S1 of FIG. 9.

Next, the operation unavailable region detecting process performed in step S1 of FIG. 9 will be described with reference to the flowchart of FIG. 10.

In step S11, the operation unavailable region detecting unit 61 takes notice of an element of predetermined coordinates among all of the elements used to detect an input. For example, each pixel of the display unit 11 is set as an element or each resolution of the touch panel 46 (each electrode arranged in a matrix) is set as an element, notice is taken from an element in the upper left corner in order.

In step S12, the operation unavailable region detecting unit 61 determines whether an input is continuously detected at the element being noticed for a certain time based on the signal from the touch panel 46.

If it is determined in step S12 that an input is continuously detected at the element being noticed for a certain time, the operation unavailable region detecting unit 61 determines, in step S13, whether an input is detected also at the peripheral parts of the element being noticed.

If it is determined in step S13 that an input is continuously detected at the periphery of the element being noticed, the operation unavailable region detecting unit 61 determines, in step S14, whether a condition of the element being noticed is an operation unavailable condition.

If it is determined in step S14 that a condition of the element being noticed is an operation unavailable condition, the operation unavailable region detecting unit 61 sets, in step S15, the information indicating the condition of the element being noticed as "operation unavailable".

On the other hand, if it is not determined in step S14 that a condition of the element being noticed is an operation unavailable condition, the operation unavailable region detecting unit 61 sets, in step S16, the information indicating the condition of the element being noticed as "difficulty in operation".

When the touch panel 46 is a capacitive touch panel, the operation unavailable region detecting unit 61 can determine whether an input is detected by the touch panel 46 through a solid object or liquid such as water, based on an input on the touch panel 46. If it is determined that an input is detected as a solid object by the touch panel 46, the condition is determined to be an operation unavailable condition in step S14. If it is determined that an input is detected as liquid by the touch panel 46, the condition is determined to be a condition of difficulty in operation in step S14.

On the other hand, if it is not determined in step S12 that an input is continuously detected at the element being noticed for a certain time, the operation unavailable region detecting unit 61 sets, in step S17, the information indicating the condition of the element being noticed as "operation available".

Likewise, if it is not determined in step S13 that an input is detected at the periphery of the element being noticed, the operation unavailable region detecting unit 61 sets, in step S17, the information indicating the condition of the element being noticed as "operation available". The condition of the element being noticed is determined using not only the element being noticed but also a condition of a certain range that contains the element being noticed.

The information indicating a condition of each element is represented, for example, as a value (X, Y, Object) obtained by associating with the coordinates (X,Y). The value of Object that is set to "0" indicates that the condition of an element at the coordinates (X,Y) is "available for operation". The value of Object that is set to "1" indicates that the condition of an element at the coordinates (X,Y) is "unavailable for operation" because an object is placed. The value of Object that is set to "2" indicates that the condition of an element at the coordinates (X,Y) is "difficult to operate" because of the presence of liquid or the like adhered thereto. The information indicating a condition of each element is stored and managed, for example, in a storing unit of the memory 47.

In step S18, the operation unavailable region detecting unit 61 determines whether all of the elements have been noticed. If it is determined that there is any element which is not noticed yet, the process returns to step S11. Then, an element being noticed is switched to another and the subsequent steps are repeated.

On the other hand, if it is determined in step S18 that all of the elements have been noticed, the operation unavailable region detecting unit 61 terminates the process. This allows the information indicating a condition of all of the coordinates to be stored in the memory 47. Then, the process returns to step S1 of FIG. 9 and the subsequent steps are performed.

The liquid moves in an input region at a relatively high speed, and thus the condition of an element may be determined in a shorter time. The operation may be performed even when there is liquid depending on a method of detecting an input. In this case, the information indicating the condition of an element is not set as "difficulty in operation" (value of Object is "2"). The "difficulty in operation" as the information indicating the condition of an element is used as necessary depending on a method of detecting an input or the kinds of liquid.

[Interface Dynamic Change Process]

Next, the interface dynamic change process performed in step S2 of FIG. 9 will be described with reference to the flowchart of FIG. 11.

In step S31, the interface dynamic change processing unit 62 performs preprocessing. The preprocessing is a process including the grouping of operation targets. The preprocessing may be performed prior to the interface dynamic change process. The detailed particulars of the preprocessing will be described later with reference to the flowchart of FIG. 12.

In step S32, the interface dynamic change processing unit 62 performs an interface configuration change necessity ratio calculation process. The interface configuration change necessity ratio calculation process is a process of calculating the interface configuration change necessity ratio as a reference for determining whether the screen configuration is to be changed. The detailed particulars of the interface configuration change necessity ratio calculation process will be described later with reference to the flowchart of FIG. 15.

In step S33, the interface dynamic change processing unit 62 performs a threshold process. The threshold process is a process of determining whether the screen configuration is to be changed based on the interface configuration change necessity ratio. The detailed particulars of the threshold process will be described later with reference to the flowchart of FIG. 17.

Next, the preprocessing performed in step S31 of FIG. 11 will be described with reference to the flowchart of FIG. 12.

In step S41, the interface dynamic change processing unit 62 performs a grouping of operation targets.

Figure 13:
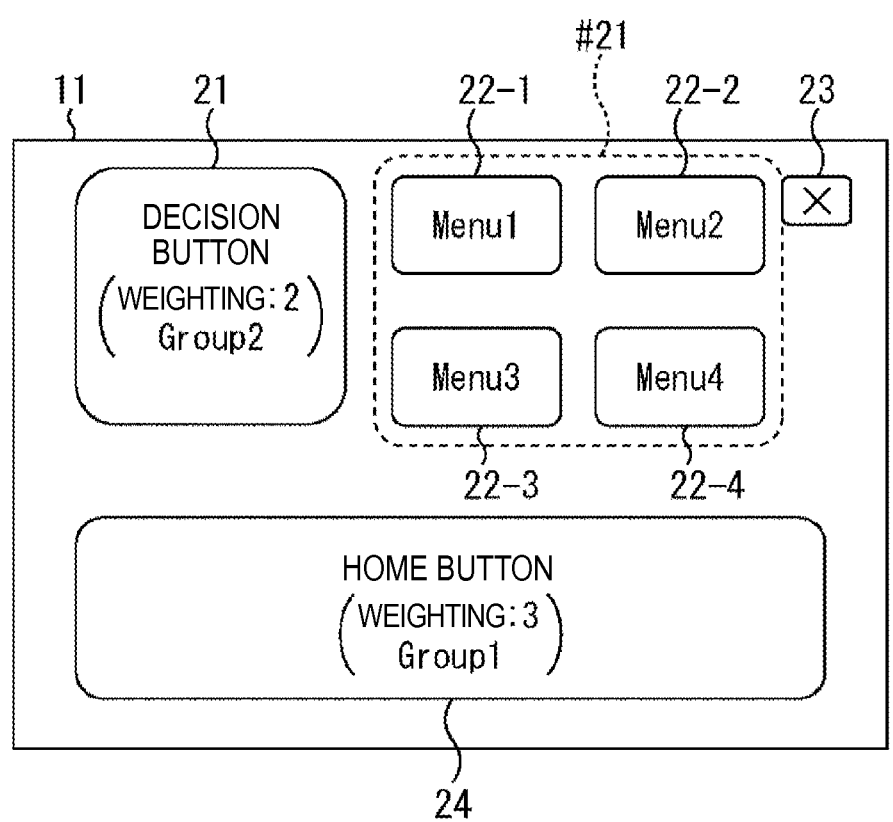
FIG. 13 is a diagram illustrating an example of the grouping of operation targets.

FIG. 13 is a diagram illustrating an example of the grouping of operation targets.

When the same screen as the screen shown in FIG. 2 is displayed on the display unit 11, the interface dynamic change processing unit 62 collects the setting buttons 22-1 to 22-4 as a single operation target group, as surrounded by the broken line #21 in FIG. 13. For example, the interface dynamic change processing unit 62 have information on how to classify the operation targets to be put into the same group in advance. The grouping of operation targets by the interface dynamic change processing unit 62 is performed using information given in advance.

Examples of the grouping of operation targets to be performed are as follows:

Example 1. When there are multiple setting buttons representing selectable options, they are collected as one operation target.

Example 2. Operation targets used in exclusive selection, such as Yes/No or executable/non-executable, are collected as one operation target.

Example 3. Rectangular or circular scroll menu regions including multiple buttons are collected as a one operation target.

The interface dynamic change processing unit 62 sets each of the decision button 21, the close button 23, and the home button 24 as a single operation target group. Thus, a single operation target group may be composed of one operation target. When the screen configuration is changed, the movement or scaling of an operation target is performed on a group basis.

In the example shown in FIG. 13, an operation target group composed of the home button 24 is set as Group 1, and an operation target group composed of the decision button 21 is set as Group 2. An operation target group composed of the setting buttons 22-1 to 22-4 is set as Group 3, and an operation target group composed of the close button 23 is set as Group 4.

In FIG. 13, Information other than the text "DECISION BUTTON" in the decision button 21 and information other than the text the text "HOME BUTTON" in the home button 24 is shown only for the sake of description, rather than being displayed actually on the screen. This is similarly applicable to other drawings.

Figure 14:
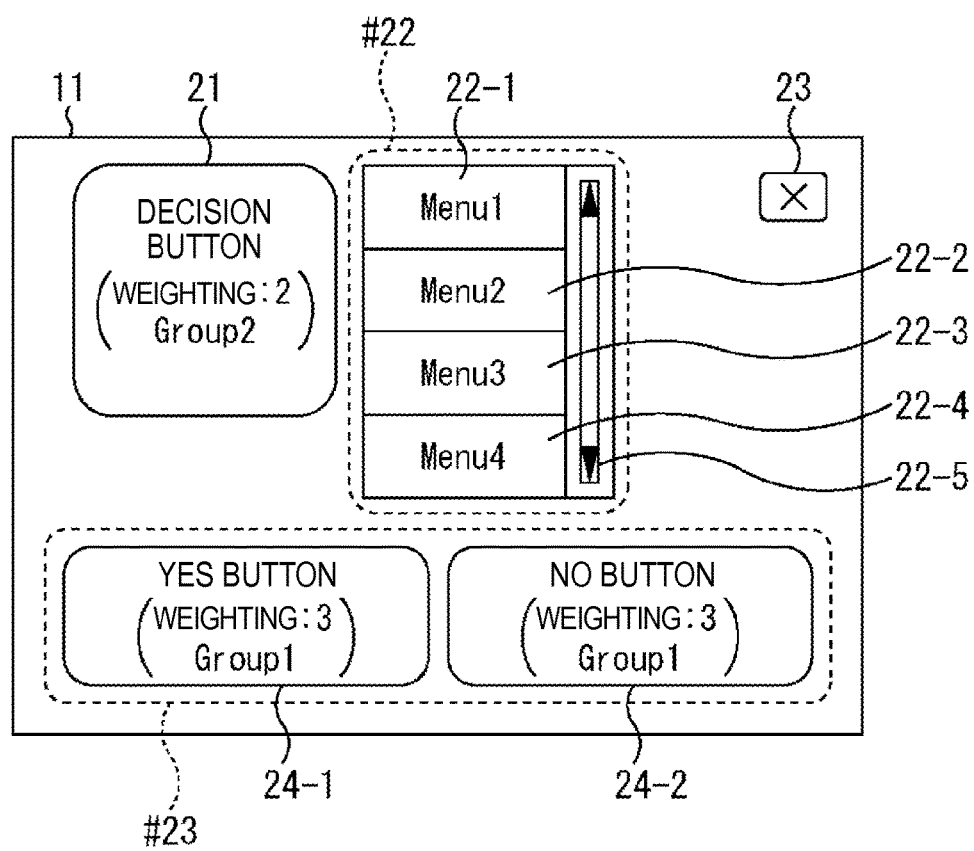
FIG. 14 is a diagram illustrating another example of the grouping of operation targets.

FIG. 14 is a diagram illustrating another example of the grouping of operation targets.

In the example shown in FIG. 14, the setting buttons 22-1 to 22-4 are displayed side by side in a vertical direction on the immediate right of the decision button 21, and a slide bar 22-5 is displayed on the right of the setting buttons. A YES button 24-1 and a NO button 24-2 are displayed, instead of the home button 24.

In this case, the interface dynamic change processing unit 62 collects the setting buttons 22-1 to 22-4 and the slide bar 22-5 as a single operation target group, which is shown as surrounded by the broken line #22. The interface dynamic change processing unit 62 collects the YES button 24-1 and the NO button 24-2 as a single operation target group, which is shown as surrounded by the broken line #23.

In this way, similar operation targets are collected as a single operation target group, and thus operation targets to be used for similar operations can be moved to a position close to each other or they can be displayed with the same size.

For example, with the change in the screen configuration, when operation targets to be used for similar operations are moved to different positions or they are displayed with different sizes, the consistency (uniformity) of operation procedures may not be kept, but this can be prevented.

Specifically, there is no sense in displaying only the YES button 24-1 of the YES button 24-1 and the NO button 24-2, but it is possible to be prevented from becoming such a state. For the setting buttons 22-1 to 22-4, if some of the setting buttons 22-1 to 22-4 are not displayed and any item among all of the selectable options is difficult to be selected, the user is in confusion, but this can be prevented.

Referring back to FIG. 12, in step S42, the interface dynamic change processing unit 62 assigns the weight depending on the priority for each operation target. For example, the interface dynamic change processing unit 62 have the information on the priority of each operation target in advance.

The priority of an operation target may have a three-level value hierarchy as a configuration depending on functions of the operation target, as follows:

Priority 1: Important function (power button, home button, return button, shutter button, etc.)

Priority 2: Normal function (decision button, close button)

Priority 3: Other functions (detailed buttons)

The priority may be set depending on the area of an operation target, while there is an important button that has an important function but is small in area, such as the close button 23. The previous setting of the priority depending on the function of an operation target allows an operation target having an important function to be prevented from being displayed in a smaller form upon the change in the screen configuration.

The interface dynamic change processing unit 62 may assign the weight of 3 to the home button 24 having Priority 3, and assign the weight of 2 to the decision button 21 having Priority 2. The interface dynamic change processing unit 62 may assign the weight of 2 to the close button 23 having Priority 2, and assign the weight of 1 to the setting buttons 22-1 to 22-4 having Priority 1.

In step S43, the interface dynamic change processing unit 62 sets the threshold th0 for each operation target. By using the set threshold th0, the determination of whether an operation target is to be unavailable for operation is performed in the interface configuration change necessity ratio calculation process.

The threshold th0 varies depending on the size of the button. For example, the threshold th0 of 50% is set to the power button having the size of 20 mm×10 mm. The threshold th0 of 50% indicates that the power button is determined to be an operation target unavailable for operation when the area of the operation unavailable region that extends to a region occupied by the power button is greater than or equal to 50% of the area of the power button region.

The threshold th0 of 20% is set to the setting buttons having the size of 4 mm×2 mm. The threshold th0 of 20% indicates that the setting button is determined to be an operation target unavailable for operation when the area of the operation unavailable region that extends to a region occupied by the setting button is greater than or equal to 20% of the area of the power button region.

Figure 11:
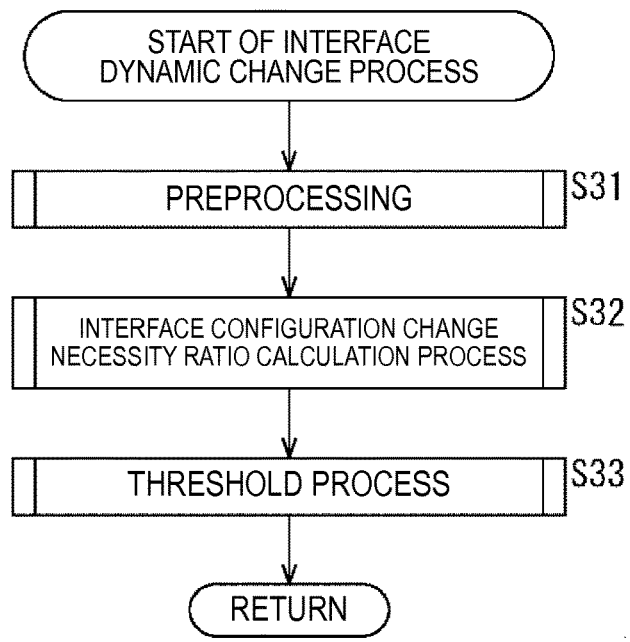
FIG. 11 is a flowchart illustrated to describe an interface dynamic change process performed in step S2 of FIG. 9.
Figure 12:
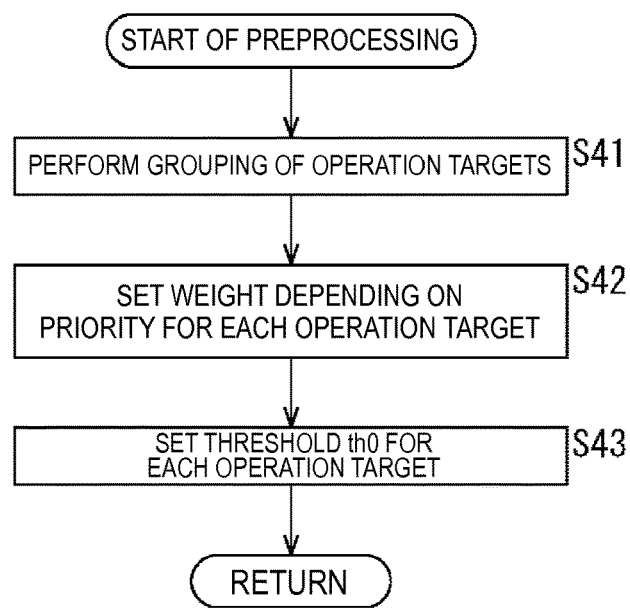
FIG. 12 is a flowchart illustrated to describe preprocessing performed in step S31 of FIG. 11.

After the threshold th0 is set in step S43, the process returns to step S31 of FIG. 11, and the subsequent process is performed.

Next, the interface configuration change necessity ratio calculation process performed in step S32 of FIG. 11 will be described with reference to the flowchart of FIG. 15.

In step S51, the interface dynamic change processing unit 62 clears an interface configuration change necessity score. The interface configuration change necessity score is a score obtained on the basis of the weight or the like depending on the priority for each operation target group. As a score is higher, the number of regions available for operation is smaller, i.e. the higher score means that it is an operation target group having higher necessity to change the screen configuration.

In step S52, the interface dynamic change processing unit 62 takes notice of a given operation target group.

In step S53, the interface dynamic change processing unit 62 calculates an operation unavailable region ratio that is the percentage of area of the operation unavailable region to the total area of a region occupied by the operation target group being noticed. The operation unavailable region that extends to the region occupied by operation target group is specified by information indicating the condition of each element supplied from the operation unavailable region detecting unit 61.

The operation unavailable region ratio is obtained from the following Equation (1).

[Math. 1]

$$\text{Operation unavailable region ratio} = \text{Area of operation unavailable region} / \text{Total area of operation target group} \quad (1)$$

When an obstacle that extends to a region occupied by the operation target group being noticed makes it difficult to perform an operation like liquid, a difficult-to-operate region ratio is obtained. The difficult-to-operate region ratio is the percentage of area of a difficult-to-operate region to the total area of a region occupied by the operation target group being noticed. The difficult-to-operate region ratio is used in the process to be performed later, which is similar to the operation unavailable region ratio.

In step S54, the interface dynamic change processing unit 62 acquires the threshold th0 of the operation target group being noticed. The threshold th0 is set for each operation target in step S43 of FIG. 12.

For example, when the operation target group being noticed is composed of one operation target, a threshold th0 that is set for the operation target is acquired as the threshold th0 of the operation target group. When the operation target group being noticed is composed of a plurality of operation targets, a predetermined value, for example, an average of the threshold th0 that is set for these operation targets is acquired as the threshold th0 of the operation target group.

In step S55, the interface dynamic change processing unit 62 determines whether the operation unavailable region ratio of the operation target group being noticed is greater than or equal to the threshold th0.

If it is determined in step S55 that the operation unavailable region ratio of the operation target group being noticed is greater than or equal to the threshold th0, then in step S56, the interface dynamic change processing unit 62 calculates a weighting score of the operation target group being noticed.

When an operation unavailable region exists in a region occupied by the operation target group being noticed at the ratio greater than or equal to the threshold th0, the weighting score is obtained by the following Equation (2).
[Math. 2]

$$\text{Weighting score} = \text{Weight} \times \text{Coefficient of } 1.0 \qquad (2)$$

When a difficult-to-operate region exists in a region occupied by the operation target group being noticed at the ratio greater than or equal to the threshold th0, the weighting score is obtained by the following Equation (3).
[Math. 3]

$$\text{Weighting score} = \text{Weight} \times \text{Coefficient of } 0.6 \qquad (3)$$

In step S57, the interface dynamic change processing unit 62 calculates the interface configuration change necessity score.

The interface configuration change necessity score is obtained by adding the weighting score of the operation target group including an operation unavailable region or a difficult-to-operate region at the ratio greater than or equal to the threshold th0. In other words, in step S57, the weighting score obtained in step S56 is added to the interface configuration change necessity score.

On the other hand, if it is not determined that the operation unavailable region ratio of the operation target group being noticed is greater than or equal to the threshold th0, steps S56 and S57 are skipped.

In step S58, the interface dynamic change processing unit 62 determines whether the operation target groups all have been noticed. If the interface dynamic change processing unit 62 determines in step S58 that there is an operation target group that is not noticed, the process returns to step S52. Then, the operation target group being noticed is switched to another and the above processes are repeated.

On the other hand, if it is determined in step S58 that all of the operation target groups have been noticed, in step S59, the interface dynamic change processing unit 62 calculates an interface configuration change necessity ratio.

The interface configuration change necessity ratio is obtained by dividing a sum of the interface configuration change necessity ratio, that is, weighting scores of the operation target group to which an operation unavailable region or a difficult-to-operate region extends at the ratio greater than or equal to the threshold th0 by a sum of weighting scores of all of the operation target groups.

The interface configuration change necessity ratio is expressed by the following Equation (4).
[Math. 4]

$$\begin{aligned}\text{Interface configuration change necessity}\\ \text{ratio} = \text{Interface configuration change necessity}\\ \text{score/Sum of weighting scores of operation target groups}\end{aligned} \qquad (4)$$

Figure 16:
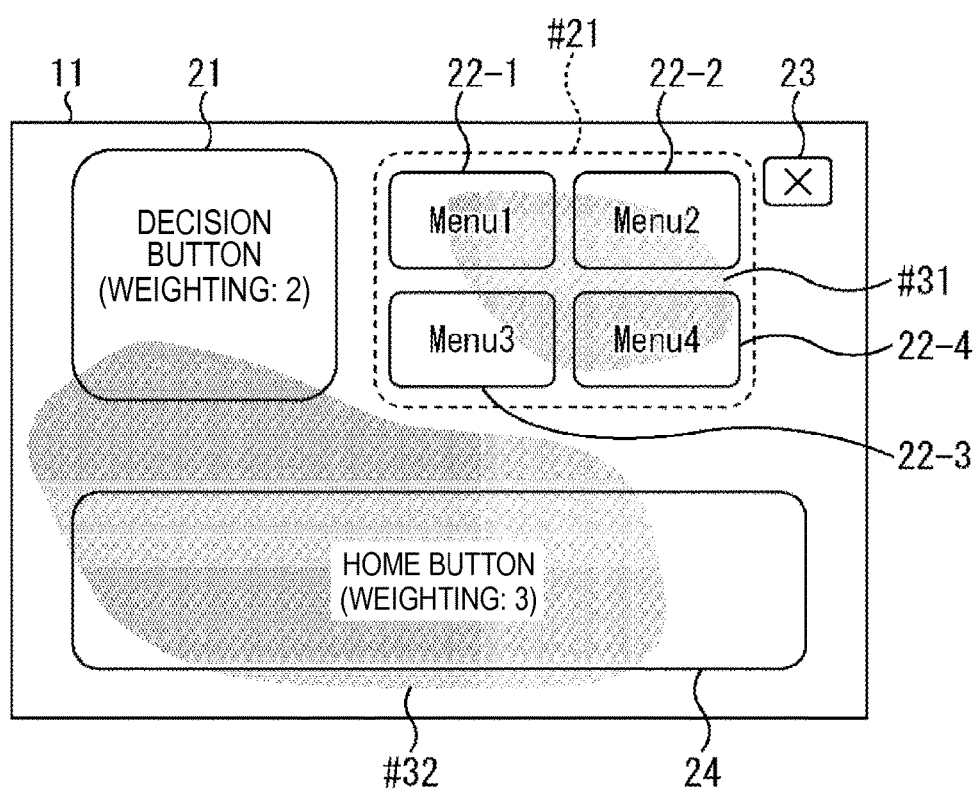
FIG. 16 is a diagram illustrating an example of the state of the presence of an obstacle on a display unit.

FIG. 16 is a diagram illustrating an example of the state of the presence of an obstacle on the display unit 11.

The screen configuration shown in FIG. 16 is the same as the screen configuration shown in FIG. 2 or other drawings. In a region #31 that extends to a region occupied by the operation target group composed of the setting buttons 22-1 to 22-4 shown as surrounded by the broken line #21, water droplets are detected as an obstacle. In a region #32 that extends in the form across the lower part of a region occupied by the operation target group composed of the decision button 21 and a part other than the right side of a region occupied by the operation target group composed of the home button 24, an obstacle such as the palm of the user's hand is detected. The region #31 is the difficult-to-operate region, and the region #32 is the operation unavailable region.

In this case, the operation unavailable region ratio of the operation target group of Group 2 composed of the decision button 21 is obtained by dividing the area of a region #32 that extends to the decision button 21 by the area of a region occupied by the decision button 21 (step S53). For example, the operation unavailable region ratio of the operation target group of Group 2 is less than the threshold th0, and thus the calculation of a weighting score for the operation target group for Group 2 is not performed.

The operation unavailable region ratio of the operation target group of Group 1 composed of the home button 24 is obtained by dividing the area of the region #32 that extends to the home button 24 by the area of the region occupied by the home button 24 (step S53). For example, the operation unavailable region ratio of the operation target group of Group 1 is greater than or equal to the threshold th0, and thus the calculation of a weighting score for the operation target group of Group 1 is performed (step S56). The weighting score of the operation target group of Group 1 is obtained as a score of 3 points (weight of 3×coefficient of 1.0) by the above Equation (2).

The difficult-to-operate region ratio of the operation target group of Group 3 composed of the setting buttons 22-1 to 22-4 is obtained by dividing the area of the region #31 by the area of a region occupied by the operation target group of Group 3 (step S53). For example, the difficult-to-operate region ratio of the operation target group of Group 3 is greater than or equal to the threshold th0, and thus the calculation of a weighting score for the operation target group of Group 3 is performed (step S56). The weighting score of the operation target group of Group 3 is obtained as a score of 1.2 points (weight of 2×coefficient of 0.6) by the above Equation (3).

After the operation target groups are all noticed, interface configuration change necessity score is obtained as a score of 4.2 points (3 points+1.2 points). The interface configuration change necessity ratio is 47% of a value obtained by dividing the score of 4.2 points by a score of 9 points as the sum of weighting scores of all of the operation target groups.

The score of 9 points as the sum of weighting scores is obtained by adding a score of 3 points (weight of 3×coefficient of 1.0) as a weighting score of operation target group of Group 1, a score of 2 points (weight of 2×coefficient of 1.0) as a weighting score of operation target group of Group 2, a score of 2 points (weight of 2×coefficient of 1.0) as a weighting score of operation target group of Group 3, and a score of 3 points (weight of 3×coefficient of 1.0) as a weighting score of operation target group of Group 4.

In this way, in the interface configuration change necessity ratio calculation process, the necessity for change of a screen configuration is estimated using the weight depending on the priority and the coefficient depending on the type of an obstacle on a target to be operated. After the interface configuration change necessity ratio is obtained, the process returns to step S32 and the subsequent steps are performed.

Figure 17:
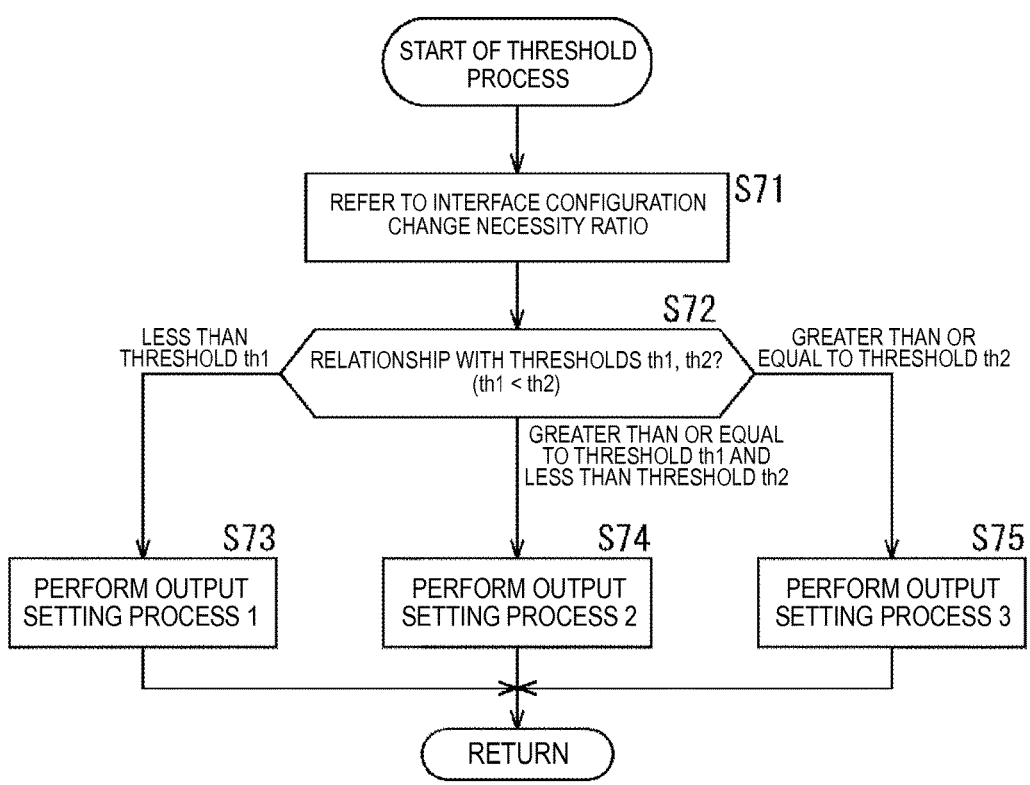
FIG. 17 is a flowchart illustrated to describe a threshold process performed in step S33 of FIG. 11.

Next, the threshold process performed in step S33 of FIG. 11 will be described with reference to the flowchart of FIG. 17.

Figure 15:
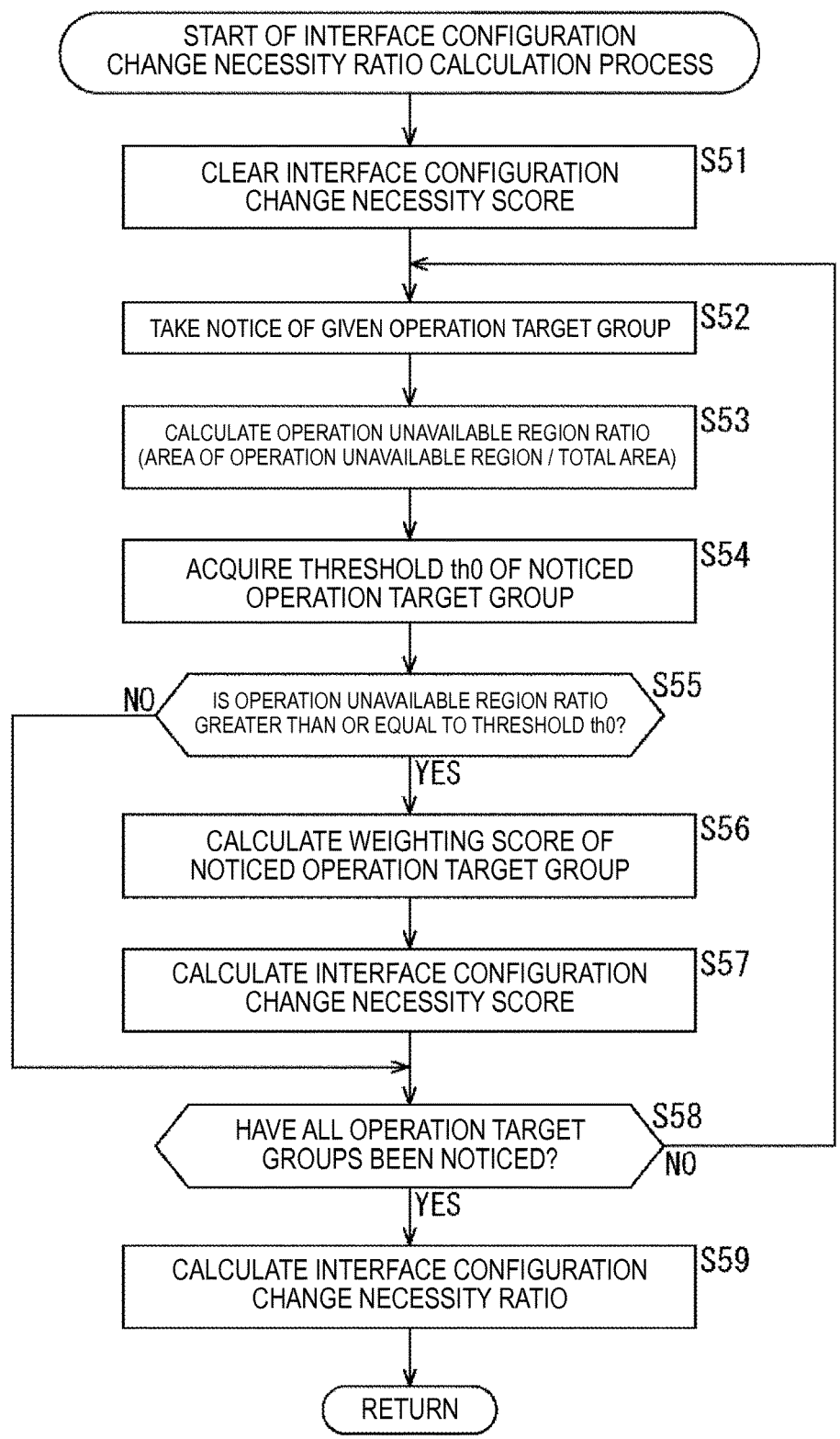
FIG. 15 is a flowchart illustrated to describe an interface configuration change necessity ratio calculation process performed in step S32 of FIG. 11.

In step S71, the interface dynamic change processing unit 62 refers to the interface configuration change necessity ratio obtained by performing the process of FIG. 15.

In step S72, the interface dynamic change processing unit 62 determines the relationship between the interface configuration change necessity ratio and the thresholds th1 and th2. The type of change in the screen configuration is determined based on the interface configuration change necessity ratio that indicates the necessity for a change of screen configuration.

The threshold th1 is used to check the condition where there is no necessity to change the screen configuration when there is an obstacle on the display unit 11. On the other hand, the threshold th2 is used to check the condition where the screen configuration is unable to be changed because the area of the operation unavailable region or the difficult-to-operate region is excessively large. The threshold th2 is a value exceeding the threshold th1.

If it is determined in step S72 that the interface configuration change necessity ratio is smaller than the threshold th1, in step S73, the interface dynamic change processing unit 62 performs an output setting process 1.

The output setting process 1 is a process of setting an output from the output control unit 63 by causing an operation target unavailable for operation to be in a grayout state or to be a state that is displayed by a dotted line, without a change in the screen configuration. This allows the user to check the presence of an operation target unavailable for operation. Information such as a wording representing an operation unavailable is assigned to an operation target unavailable for operation, as necessary.

On the other hand, if it is determined in step S72 that the interface configuration change necessity ratio is greater than or equal to the threshold th1 and smaller than the threshold th2, in step S74, the interface dynamic change processing unit 62 performs an output setting process 2.

The output setting process 2 is a process of setting the output from the output control unit 63 to change the screen configuration in the manner as described with reference to FIGS. 4 and 6.

If it is determined in step S72 that the interface configuration change necessity ratio is greater than or equal to the threshold th2, in step S75, the interface dynamic change processing unit 62 performs an output setting process 3.

The output setting process 3 is a process of setting the output from the output control unit 63 to allow the user to check that it is a state that is unable to be operated completely.

After the output setting process 1, the output setting process 2, and the output setting process 3 are performed, the process returns to step S33 of FIG. 11 and the subsequent steps are performed. In the subsequent process in step S3 of FIG. 9, the output on the display unit 11 is changed by the output control unit 63 according to the details that are set by the output setting processes 1, 2, and 3.

A specific example of values that are set as the thresholds th1 and th2 as follows:
Example 1 : threshold th1=0.2 and threshold th2=0.8
Example 2 : threshold th1=0.4 and threshold th2=0.6

In Example 1, the screen configuration is dynamically changed at a relatively high frequency. In Example 2, when an obstacle shields some regions, the screen configuration is not changed, or when about half or more regions are shielded, the entire region is unavailable for operation. Thus, a change in the screen configuration is hardly performed. The threshold th1 and the threshold th2 are not a fixed value but a variable value that varies depending on circumstances or settings.

[Output Setting Process 1]

The output setting process 1 is now described. The output setting process 1 is a process of changing the display state of an operation target without a change in the screen configuration. By changing the display state, a visual change to show the operation unavailable to the user is set.

Modification 1

FIG. 18 is a diagram illustrating a modification 1 for a state in which an operation target is displayed.

In FIG. 18, the part A illustrates an example in which an operation target unavailable for operation is in a grayout state, the part B illustrates an example in which the background and color of an operation target unavailable for operation is changed, and the part C illustrates an example in which a wording or red color indicating the operation unavailable is added to an operation target unavailable for operation.

Thus, the user can check that an operation target having the changed display state is an operation target that is unavailable for operation.

Modification 2

Figure 19:
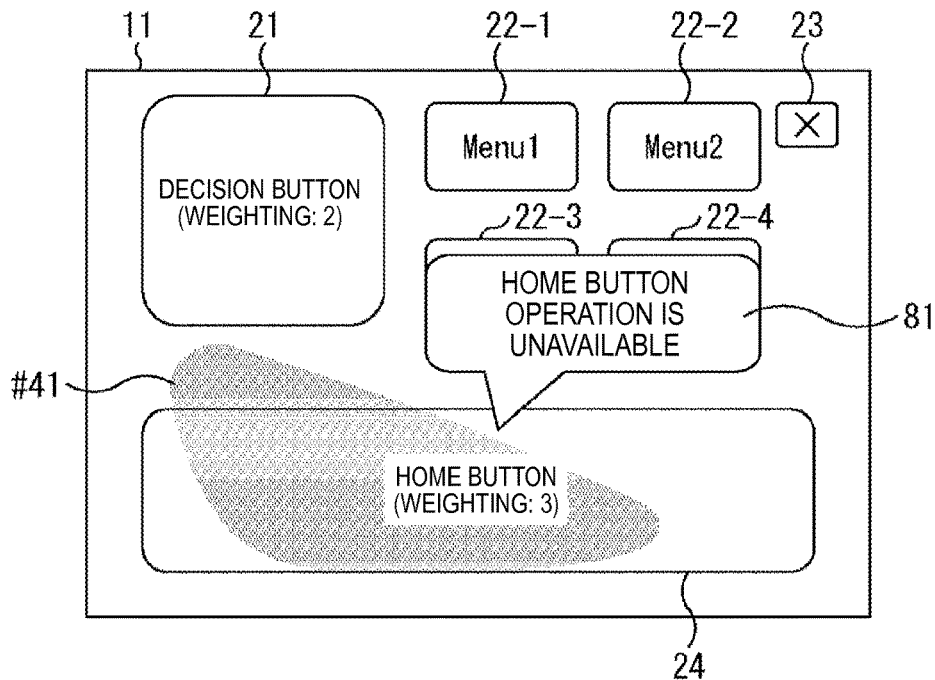
FIG. 19 is a diagram illustrating a modification 2 of a display state of an operation target.

FIG. 19 is a diagram illustrating a modification 2 for a state in which an operation target is displayed.

As shown in the upper part of the home button 24 to which the operation unavailable region (region #41) extends, a speech balloon 81 is displayed by setting the home button 24 as a speech balloon source, and the text "HOME BUTTON OPERATION IS UNAVAILABLE" is displayed inside the speech balloon 81.

In this way, the output by the output control unit 63 is set by allowing information including a wording (name, nickname, function name, etc.) relating to an operation target that is unavailable for operation to be displayed in a popup or at a specified position. When a region in which information is displayed is overlapped with a region of other operation targets, a popup may be displayed to allow the region in which information is displayed to be overlapped with a region of an operation target having lower priority.

In this way, the display of a speech balloon enables the user to check that the operation target specified by the speech balloon is unavailable for operation.

Modification 3

When there is an operation target that is unavailable for operation, the display state may not be changed.

In the output setting process 1, any process among processes of changing the display state as described above is performed. The user may set how to determine which process is performed.

[Output Setting Process 2]

Next, the output setting process 2 will be described. The output setting process 2 is a process of changing the screen configuration. There will be described a case in which an operation unavailable region is detected in a state where a screen that is the same as the screen of FIG. 2 is displayed.

Modification 1

Figure 20:
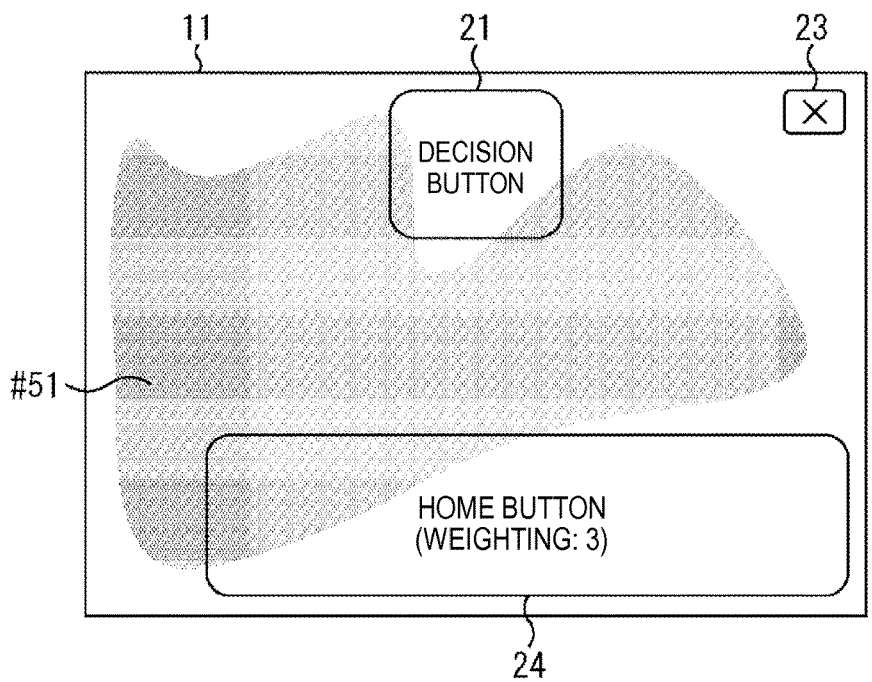
FIG. 20 is a diagram illustrating a modification of the screen configuration.

FIG. 20 is a diagram illustrating a modification of the screen configuration.

When a region #51 is detected as the operation unavailable region, only the operation target group having higher priority is moved to an operation available region that is a region other than the region #51 and then is displayed. The operation available region may be extended to the extent there is no hindrance to the region of the operation target group after the movement.

In the example shown in FIG. 20, the setting buttons 22-1 to 22-4, which are an operation target group having lower priority, are not displayed, but the decision button 21, the close button 23, and the home button 24, which are operation target groups having lower priority, are displayed. When some of the operation target groups having the same priority are not displayed, an operation target group having a wider area is preferentially displayed over other groups.

In this way, by reconstructing the screen configuration depending on the priority of the operation target, it is possible to allow the user to perform an operation using the operation target having higher priority without any interruption.

Figure 21:
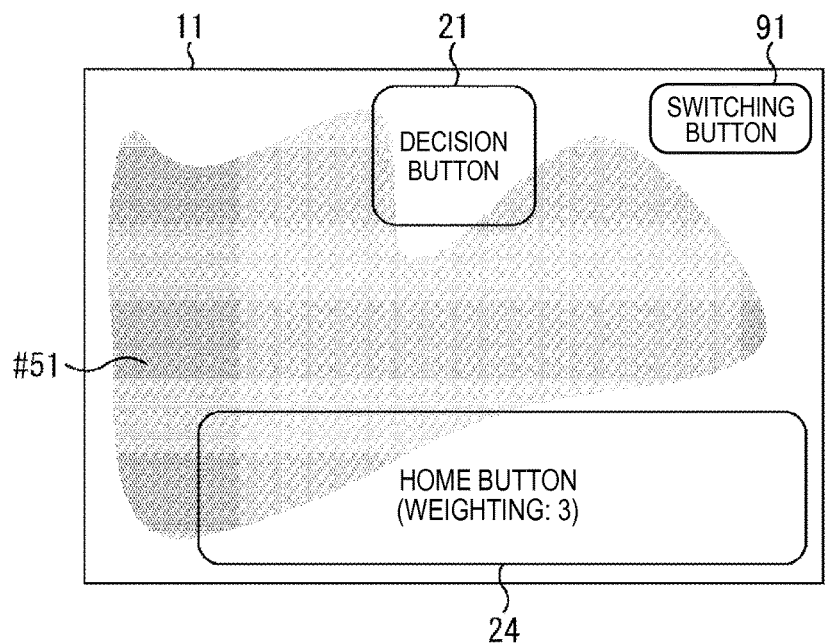
FIG. 21 is a diagram illustrating another modification of the screen configuration.
Figure 22:
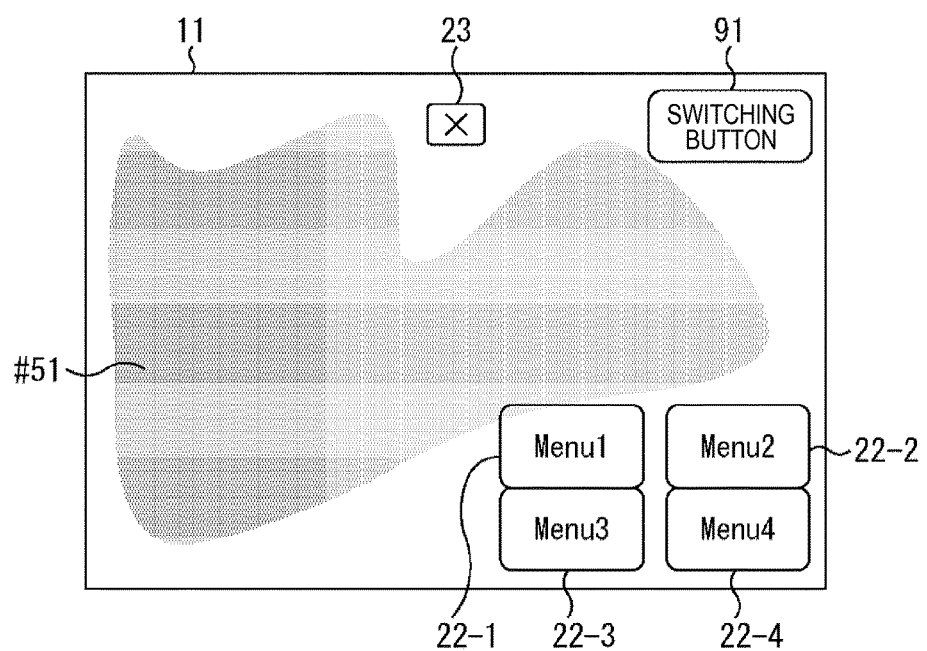
FIG. 22 is a diagram illustrating another modification of the screen configuration.

FIGS. 21 and 22 are diagrams illustrating another modification of the screen configuration.

In the examples shown in FIGS. 21 and 22, an operation target group having higher priority is displayed in the higher level, but an operation target group having lower priority is displayed in the lower level.

FIG. 21 illustrates a state in which the decision button 21 and the home button 24, which are an operation target group in the higher level, are displayed in the operation available region. The decision button 21 is displayed in the operation available region at the upper center of the screen, and the home button 24 is displayed in the operation available region at the lower right of the screen. A switching button 91 is displayed in the operation available region at the upper right corner of the screen. The switching button 91 is operated to switch the level of an operation target.

FIG. 22 illustrates a state in which the switching button 91 is operated in the state of FIG. 21 and the setting buttons 22-1 to 22-4 and the close button 23, which are operation target groups in the lower level, are displayed. The close button 23 is displayed in the operation available region in which the decision button 21 was displayed, instead of the decision button 21. The setting buttons 22-1 to 22-4 are displayed in the operation available region in which the home button 24 was displayed, instead of the home button 24. In the state of FIG. 22, when the switching button 91, which is displayed in the operation available region at the upper right corner of the screen, is operated, the screen is switched to the screen of FIG. 21.

In this way, it is possible for the user to perform an operation using an operation target having higher priority and an operation target having lower priority without any interruption.

The change in the screen configuration as shown in FIGS. 20 to 21 is performed when some of the operation target groups to be displayed may not be moved to only a region that is left as an operation available region while maintaining their size.

Modification 3

As described with reference to FIG. 3, it is also possible for all of the operation targets included in one screen to be displayed in one operation available region in a reduced form while maintaining their positional relationship.

A text or the like assigned to each operation target is displayed in a reduced form or an abbreviated form as appropriate. The change in the screen configuration as shown in FIG. 3 is performed, for example, when an operation available region exists as grouped together in one place over a wider range.

As described with reference to FIG. 6, it is also possible for all of the operation targets included in one screen to be displayed in an operation available region without maintaining their positional relationship and by changing the shape of each operation target as appropriate.

The change in shape of an operation target includes not only a change of shape but also enlargement/reduction. A text or the like assigned to each operation target is displayed in a reduced form or an abbreviated form as appropriate. The change in the screen configuration as shown in FIG. 6 is performed, for example, when operation available regions are disposed at a plurality of places.

In this way, all of the operation targets can be displayed by changing a position, shape, or the like rather than omission of the operation target having lower priority, and thus it is possible for the user to perform an operation using all of the operation targets without interruption.

In the output setting process 2, any process among processes of changing the screen configuration as described above is performed. The user may set how to determine which process is performed.

[Output Setting Process 3]

Next, the output setting process 3 will be described. The output setting process 3 is a process of changing the display state to allow the user to check that the operation targets are all unavailable.

Modification 1

Figure 23:
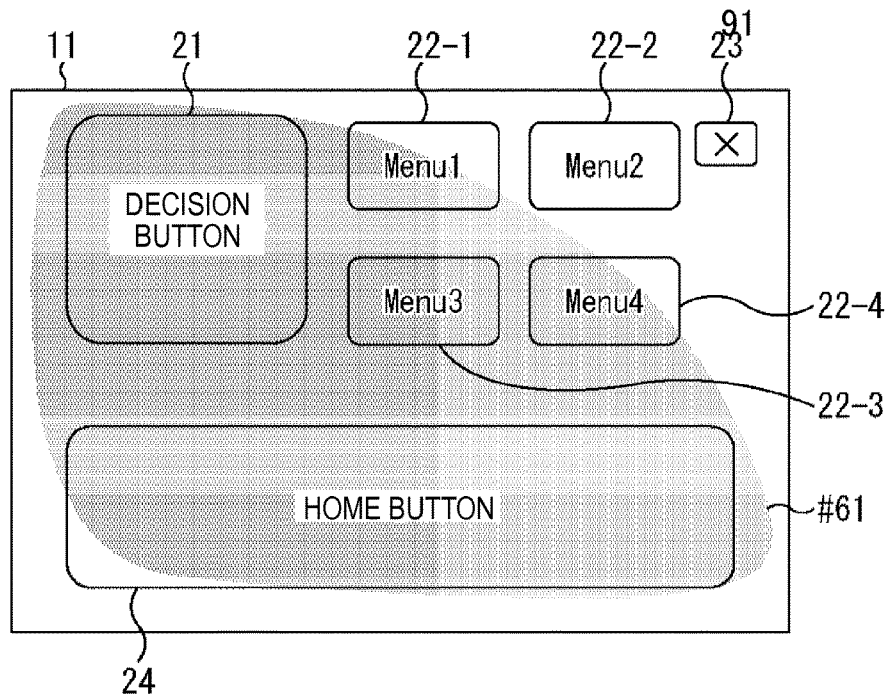
FIG. 23 is a diagram illustrating an example of a screen in which an operation unavailable region is present.

FIG. 23 is a diagram illustrating an example of a screen in which an operation unavailable region is present.

In the example shown in FIG. 23, an obstacle is detected in a region #61 as a region that covers substantially the entire except for the upper right corner of the screen, and the obstacle becomes an operation unavailable region. The output setting process 3 is performed when an operation unavailable region is detected in a wide range in this way.

In this case, the output is set so that the operation targets are all in a grayout state or in a non-display state. Thus, it is possible for the user to check that the operation targets are all unavailable for operation.

Modification 2

Figure 24:
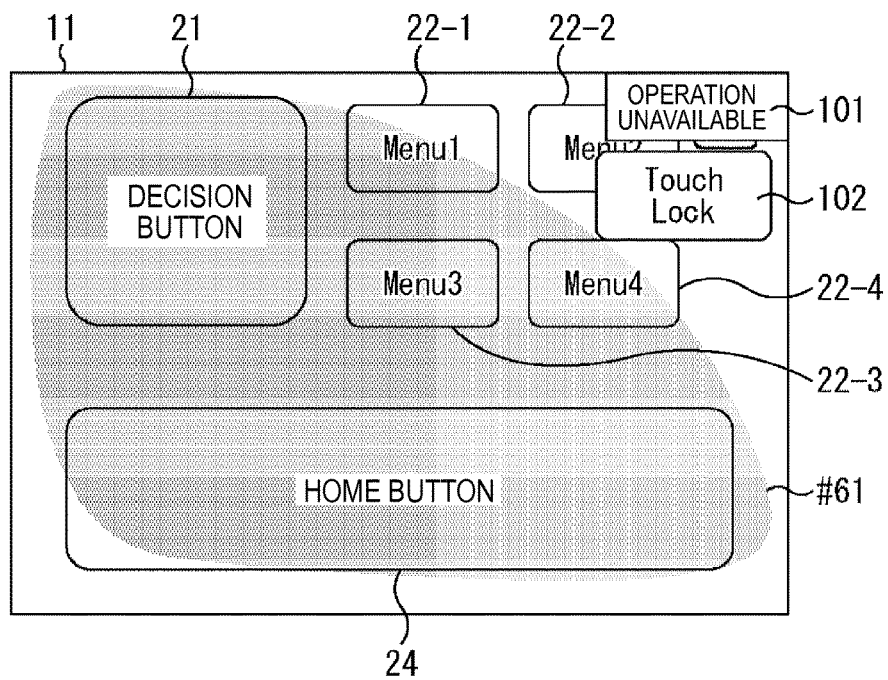
FIG. 24 is a diagram illustrating a modification of a screen display.

As shown in FIG. 24, information indicating that the operation targets are all unavailable for operation may be displayed in the remaining operation available region. In the example shown in FIG. 24, a text "operation unavailable" is displayed in a region 101 that is a rectangular region within the operation available region remained in the upper right corner of the screen, in order to indicate that the operation targets are all unavailable for operation.

In the example shown in FIG. 24, an OFF button 102 is displayed below the region 101. The OFF button 102 is a button operated to turn off the input function to prevent erroneous operations.

It is possible for the user to check that the operation targets are all unavailable for operation from information displayed in the operation available region. It is possible for the user to cause all of the operation targets to be turned off itself by operating the OFF button 102, thereby preventing erroneous operations from being inputted.

Modification 3

It is possible for the user to check that the operation targets are all unavailable for operation by outputting sound of "it's not work". It is also possible for the user to check that the operation targets are all unavailable for operation by generating a vibration for every certain interval of time using a vibration function.

When such settings are performed by the interface dynamic change processing unit 62, the output control unit 63 outputs sound by driving a loudspeaker (not shown) and generates a vibration by driving a vibration generation module.

In the output setting process 3, any process among processes of changing, for example, the display state as described above is performed. The user may set how to determine which process is performed.

<Modification>

In the above, there has been described the case in which the electronic apparatus 1 is a tablet terminal. However, the above-described functions of the electronic apparatus 1 may be applicable to various devices in which operation targets including buttons displayed on a screen are operated by the user with the user's finger or a stylus.

Examples of such devices include a mobile phone, a digital camera, a game console, and a music player, as portable devices. Examples of such devices include PC, TV, ATM, electronic advertisement display systems, and vending machines, as medium-large size equipment.

The case in which the touch panel 46 provided in the electronic apparatus 1 is a capacitive touch panel has been described. However, the touch panel 46 provided in the electronic apparatus 1 may be a touch panel that employs any other detecting schemes. Examples of the type of the touch panel include a matrix resistive film touch panel (pressure sensitive touch panel), a pressure sensitive touch panel, an infrared touch panel, and an acoustic (SAW) touch panel.

It is possible to perform an operation on the electronic apparatus 1 using various input methods with an auxiliary device such as a finger or stylus, rather than use of a touch panel. For example, it is possible to detect an operation on the electronic apparatus 1 using an input device that employs a contact detection scheme based on a camera or a contact detection scheme based on a camera and depth.

[Exemplary Hardware Configuration]

A series of processing described above may be implemented in either hardware or software. When the series of processing is implemented in software, programs constituting the software are installed in a computer incorporated in dedicated hardware or a general-purpose personal computer.

Programs to be installed are provided in a form of being recorded on an optical disk (including a compact disc-read only memory (CD-ROM), a digital versatile disc (DVD)), or the removable medium 50 (shown in FIG. 7) constituted by a semiconductor memory or the like. The programs may be provided by means of a wired or wireless communication medium such as a local area network, the Internet, or a digital satellite broadcasting system. The programs may be installed in the ROM 42 or the memory 47 in advance.

It should be noted that the program executed by a computer might be a program that is processed in time series according to the sequence described in this specification or a program that is processed in parallel or at necessary timing such as upon calling.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

For example, the present technology can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

[Combination Example of Configuration]

Additionally, the present technology may also be configured as below.

(1)

An information processing device including:

a display unit configured to display a screen including an operation target to be subjected to a contact operation;

a first detection unit configured to detect an object on the display unit;

a second detection unit configured to detect an operation unavailable region among display regions of the screen based on a detection result obtained by the first detection unit, the operation unavailable region being a region in which an operation using the operation target is unable to be performed; and a change processing unit configured to change a configuration of the screen based on priority that is set for each operation target and to allow the operation target to be displayed in an operation available region, the operation available region being a region other than the operation unavailable region.

(2)

The information processing device according to (1), further including:

a storage unit configured to store information indicating whether an operation is available, as information indicating a condition of a position of each of the display regions.

(3)

The information processing device according to (2), wherein the second detection unit detects a difficult-to-operate region based on the detection result obtained by the first detection unit, the difficult-to-operate region being a region in which an operation using the operation target is difficult to perform, and wherein the storage unit stores any information among information indicating that an operation is available, information indicating that an operation is unavailable, and information indicating that an operation is difficult to perform, as information indicating a condition of a position of each of the display regions.

(4)

The information processing device according to any of (1) to (3), wherein the change processing unit changes the screen configuration when there is the operation target in which a ratio of an area of the operation unavailable region to an area of the operation target is greater than a first threshold, and wherein the threshold varies depending on an area of the operation target.

(5)

The information processing device according to any of (1) to (4), wherein the change processing unit calculates a score as a reference for determining whether the screen configuration is to be changed for each of the operation targets, based on a weight depending on the priority and a type of the object.

(6)

The information processing device according to (5), wherein the change processing unit calculates a first sum and a second sum and decides a type of change in the screen configuration based on a ratio of the second sum to the first sum, the first sum being a sum of the scores of all of the operation targets included in the screen, the second sum being a sum of the scores of the operation targets in which a ratio of an area of the operation unavailable region to an area of the operation target is greater than the first threshold.

(7)

The information processing device according to (6), wherein the change processing unit determines that the screen configuration is unnecessary to be changed when the ratio of the second sum to the first sum is smaller than a second threshold, and determines that the screen configuration is unable to be changed when the ratio of the second sum to the first sum is greater than a third threshold.

(8)

The information processing device according to (7), wherein the change processing unit, when the ratio of the second sum to the first sum is smaller than the second threshold, changes a display of the operation target in which the ratio of an area of the operation unavailable region to an area of the operation target is greater than the first threshold, without changing the screen configuration.

(9)

The information processing device according to (7), wherein the change processing unit, when the ratio of the second sum to the first sum is smaller than the second threshold, allows information indicating that an operation using the operation target in which the ratio of an area of the operation unavailable region to an area of the operation target is greater than the first threshold is unable to be performed to be displayed, without changing the screen configuration.

(10)

The information processing device according to any of (1) to (6), wherein the change processing unit changes the screen configuration in a way that only the operation target having high priority is displayed in the operation available region.

(11)

The information processing device according to (10), wherein the change processing unit allows the operation target having a large area to be displayed in the operation available region when the priority of the operation target is identical.

(12)

The information processing device according to (10), wherein the change processing unit allows a predetermined button to be displayed in the operation available region and allows the operation target having low priority, instead of the operation target having high priority, to be displayed in the operation available region in response to an operation of the predetermined button.

(13)

The information processing device according to any of (1) to (6), wherein the change processing unit allows all of the operation targets included in the screen to be displayed in the operation available region in a reduced form with arrangement maintained.

(14)

The information processing device according to (13), wherein the change processing unit allows information assigned to the operation target to be displayed in a reduced form or an abbreviated form.

(15)

The information processing device according to any of (1) to (6), wherein the change processing unit allows all of the operation targets included in the screen to be displayed in the operation available region with a change in arrangement of each operation target.

(16)

The information processing device according to (15), wherein the change processing unit, when the operation available regions are disposed at a plurality of places, allows the operation target having high priority to be displayed preferentially in the operation available region having a large area.

(17)

The information processing device according to (15) or (16), wherein the change processing unit allows information assigned to the operation target to be displayed in a reduced form or an abbreviated form.

(18)

A method of processing information, including the steps of:

displaying a screen including an operation target to be subjected to a contact operation on a display unit;

detecting an object on the display unit;

detecting an operation unavailable region among display regions of the screen based on a detection result of the object, the operation unavailable region being a region in which an operation using the operation target is unable to be performed; and changing a configuration of the screen based on priority that is set for each operation target and allowing the operation target to be displayed in an operation available region, the operation available region being a region other than the operation unavailable region.

(19)

A program that causes a computer to execute a process including the steps of:

displaying a screen including an operation target to be subjected to a contact operation on a display unit;

detecting an object on the display unit;

detecting an operation unavailable region among display regions of the screen based on a detection result of the object, the operation unavailable region being a region in which an operation using the operation target is unable to be performed; and changing a configuration of the screen based on priority that is set for each operation target and allowing the operation target to be displayed in an operation available region, the operation available region being a region other than the operation unavailable region.

REFERENCE SIGNS LIST 1 electronic apparatus
11 display unit 46 touch panel
61 operation unavailable region detecting unit
62 interface dynamic change processing unit
63 output control unit
64 user operation detecting unit
65 user operation processing unit

The invention claimed is:

1. An information processing device, comprising:
circuitry configured to:
- display at least one operation target of a plurality of operation targets on a display screen,
  wherein the at least one operation target is subjected to a user contact operation;
- detect an object is placed on the display screen;
- detect an operation unavailable region from a plurality of display regions of the display screen based on the detection of the object placed on the display screen,
  wherein the at least one operation target is inoperable in the operation unavailable region;
- determine a necessity of change of a configuration of the display screen for the at least one operation target of the plurality of operation targets,
  wherein the determination of the necessity of the change of the configuration of the display screen is based on a priority that is set for the at least one operation target and a type of the detected object on the display screen;
- change the configuration of the display screen based on the determination,
  wherein the at least one operation target is displayed in an operation available region of a plurality of operation available regions on the display screen, and
  wherein the operation available region is a first region of the plurality of display regions other than the operation unavailable region; and
- display a first operation target of the plurality of operation targets, in the operation available region with a largest area among the plurality of operation available regions,
  wherein the first operation target has a highest priority among the plurality of operation targets.

2. The information processing device according to claim 1,
wherein the circuitry is further configured to store first information indicating an availability of an operation, as the first information indicating a condition of a position of each of the plurality of display regions.

3. The information processing device according to claim 2,
wherein the circuitry is further configured to:
detect a difficult-to-operate region based on the detection of the object on the display screen, wherein the difficult-to-operate region is a second region of the plurality of display regions on which an obstacle is detected; and
store second information among the first information indicating the availability of the operation, third information indicating an unavailability of the operation, and fourth information indicating difficulty of the operation in the difficult-to-operate region, as the first information indicating the condition of the position of each of the plurality of display regions.

4. The information processing device according to claim 1,
wherein the circuitry is further configured to change the configuration of the display screen based on the at least one operation target in which a first ratio of a first area of the operation unavailable region to a second area of the at least one operation target is greater than a first threshold, and
wherein the first threshold varies based on the second area of the at least one operation target.

5. The information processing device according to claim 4,
wherein the circuitry is further configured to calculate a score for the determination of the necessity of the change of the configuration of the display screen for each of the plurality of operation targets,
wherein the determination of the necessity of the change of the configuration of the display screen is based on a weight, and
wherein the weight is based on the priority and the type of the detected object on the display screen.

6. The information processing device according to claim 5,
wherein the circuitry is further configured to calculate a first sum and a second sum and determine a type of the change in the configuration of the display screen based on a second ratio of the second sum to the first sum, and
wherein the first sum is a sum of respective scores of the plurality of operation targets included in the display screen, and the second sum is a sum of the respective scores of the plurality of operation targets in which the first ratio of the first area of the operation unavailable region to the second area of the at least one operation target is greater than the first threshold.

7. The information processing device according to claim 6,
wherein the circuitry is further configured to:
determine that the change of the configuration of the display screen is unnecessary based on the second ratio that is smaller than a second threshold, and
determine that the configuration of the display screen is unable to change based on the second ratio of the second sum to the first sum that is greater than a third threshold.

8. The information processing device according to claim 7,
wherein the circuitry is further configured to change the display of the at least one operation target in which the first ratio of the first area of the operation unavailable region to the second area of the at least one operation target is greater than the first threshold, with the configuration of the display screen unchanged, based on the second ratio of the second sum to the first sum that is smaller than the second threshold.

9. The information processing device according to claim 7,
wherein the circuitry is further configured to display information indicating the at least one operation target in which the first ratio of the first area of the operation unavailable region to the second area of the at least one operation target is greater than the first threshold is inoperable with the configuration of the display screen unchanged, based on the second ratio of the second sum to the first sum that is smaller than the second threshold.

10. The information processing device according to claim 1,
wherein the circuitry is further configured to change the configuration of the display screen such that the first operation target is displayed in the operation available region.

11. The information processing device according to claim 10,
wherein the at least one operation target from the plurality of operation targets is displayed in the operation available region based on the plurality of operation targets having identical priority.

12. The information processing device according to claim 10,
wherein the circuitry is further configured to display a button in the operation available region and display a second operation target among the plurality of operation targets, in the operation available region based on an operation of the button.

13. The information processing device according to claim 1,
wherein the circuitry is further configured to display the plurality of operation targets included in the display screen in the operation available region in a reduced form with arrangement of each operation target maintained.

14. The information processing device according to claim 13,
wherein the circuitry is further configured to display information assigned to the at least one operation target of the plurality of operation targets in one of the reduced form or an abbreviated form.

15. The information processing device according to claim 1,
wherein the circuitry is further configured to display the plurality of operation targets included in the display screen in the operation available region with a change in arrangement of each operation target of the plurality of operation targets.

16. The information processing device according to claim 15,
wherein the circuitry is further configured to display information assigned to the at least one operation target in one of a reduced form or an abbreviated form.

17. A method, comprising:
displaying at least one operation target of a plurality of operation targets on a display screen,
wherein the at least one operation target is subjected to a user contact operation;
detecting an object is placed on the display screen;
detecting an operation unavailable region from a plurality of display regions of the display screen based on the detection of the object placed on the display screen,
wherein the at least one operation target is inoperable in the operation unavailable region;
determining a necessity of change of a configuration of the display screen for the at least one operation target of the plurality of operation targets,
wherein the determination of the necessity of the change of the configuration of the display screen is based on a priority that is set for the at least one operation target and a type of the detected object on the display screen;
changing the configuration of the display screen based on the determination,
wherein the at least one operation target is displayed in an operation available region of a plurality of operation available regions on the display screen, and
wherein the operation available region is a region of the plurality of display regions other than the operation unavailable region; and
displaying an operation target of the plurality of operation targets, in the operation available region with a largest area among the plurality of operation available regions,
wherein the operation target has a highest priority among the plurality of operation targets.

18. A non-transitory computer-readable medium having stored thereon computer-executable instructions, which when executed by a computer, cause the computer to execute operations, the operations comprising:
displaying at least one operation target of a plurality of operation targets on a display screen,
wherein the at least one operation target is subjected to a user contact operation;
detecting an object is placed on the display screen;
detecting an operation unavailable region from a plurality of display regions of the display screen based on the detection of the object placed on the display screen,
wherein the at least one operation target is inoperable in the operation unavailable region;
determining a necessity of change of a configuration of the display screen for the at least one operation target of the plurality of operation targets,
wherein the determination of the necessity of the change of the configuration of the display screen is based on a priority that is set for the at least one operation target and a type of the detected object on the display screen;
changing the configuration of the display screen based on the determination,
wherein the at least one operation target is displayed in an operation available region of a plurality of operation available regions on the display screen,
wherein the operation available region is a region of the plurality of display regions other than the operation unavailable region; and
displaying an operation target of the plurality of operation targets, in the operation available region with a largest area among the plurality of operation available regions,
wherein the operation target has a highest priority among the plurality of operation targets.

* * * * *